(12) United States Patent
Haughton et al.

(10) Patent No.: US 6,282,531 B1
(45) Date of Patent: Aug. 28, 2001

(54) SYSTEM FOR MANAGING APPLIED KNOWLEDGE AND WORKFLOW IN MULTIPLE DIMENSIONS AND CONTEXTS

(75) Inventors: John F. Haughton, Westford; Robert C. Merenyi, Lexington, both of MA (US); Jeff Harris, Hampton, NH (US); Alexander Sherman, Brookline, MA (US)

(73) Assignee: CogniMed, LLC, Woburn, MA (US)

( * ) Notice: Subject to any disclaimer, the term of this patent is extended or adjusted under 35 U.S.C. 154(b) by 0 days.

(21) Appl. No.: 09/097,075

(22) Filed: Jun. 12, 1998

(51) Int. Cl.[7] .................................................. G06F 17/00
(52) U.S. Cl. ............................... 706/50; 706/46; 706/59
(58) Field of Search .............................. 706/45–47, 50, 706/59, 60, 924

(56) References Cited

U.S. PATENT DOCUMENTS 4,658,370  4/1987  Erman et al. .
4,868,733 * 9/1989  Fujisawa et al. ........................ 707/5

(List continued on next page.)

OTHER PUBLICATIONS

Kaye et al., "Cooperating Knowledge–Based Assistants for the Office," ACM Transactions on Information Systems, 1987, vol. 5, No. 4, pp. 297–326.*

Woo et al., "Supporting Distributed Office Problem Solving in Organizations," ACM Transactions on Information Systems, 1986, vol. 4, No. 3, pp. 185–204.*

Tsang et al., "A Medical Expert System Using Object–Oriented Framework," Proceedings of the IEEE Seventh Symposium on Computer–Based Medical Systems, 1994, pp. 176–181, Jun. 1994.*

Wang et al, "Supporting user defined activity spaces", Hypertext ACM pp. 112–123, 1997.*

Shibata et al, "Dynamic hypertext and knowledge agent system for multimedia information networks", ACM Hypertext, pp. 82–93, Nov. 1993.*

Su et al, "An extensible knowledge base management system for supporting rule absed interoperability among heterogenous systems", ACM CIKM pp. 1–10, Jun. 1995.*

Primary Examiner—Kakali Chaki
Assistant Examiner—Anil Khatri
(74) Attorney, Agent, or Firm—Maureen Stretch

(57) ABSTRACT

A computer system for managing applied knowledge and workflows in multiple dimensions and contexts which includes: an assessor program for screening subjects and collecting, assessing and creating objects to represent the subjects using flexible domain and subdomain descriptors; a system manager for identifying sentinel data; and at least one activity manager for creating and managing activity plans and completions for various types of task performers. In a preferred embodiment, the assessor program is able to interactively collect data about a subject and classify the information into a number of domain descriptors. Each object domain descriptor, in turn may have several subdomain descriptors. The system manager uses applied knowledge databases to identify which domain and subdomain descriptors for an object are significant for the overall assessment and system purposes and identifies these as sentinel data. Sentinel data, in turn, are analyzed by the system manager according to the knowledge database(s) to determine what, if any, activities to take to lower risks or maximize resource usage. Activities range from doing nothing, to modifying the object (individual), modifying the object's (individual's) environment or some combination of these. The system manager develops one or more plans which are turned over to one or more activity manager programs. An activity manager assigns activities and tasks to responsible task performers, notifies them of the tasks to be done, verifies completion of the tasks, and possibly initiates re-assessments.

68 Claims, 24 Drawing Sheets

U.S. PATENT DOCUMENTS

| | | | | |
|---|---|---|---|---|
| 4,907,167 | | 3/1990 | Skeirik . | |
| 4,912,648 | | 3/1990 | Tyler . | |
| 4,975,840 | | 12/1990 | DeTore et al. . | |
| 5,021,992 | * | 6/1991 | Kondo | 706/50 |
| 5,053,970 | | 10/1991 | Kurihara et al. . | |
| 5,093,794 | * | 3/1992 | Howie et al. | 700/100 |
| 5,167,010 | | 11/1992 | Elm et al. . | |
| 5,251,294 | | 10/1993 | Abelow . | |
| 5,263,126 | | 11/1993 | Chang . | |
| 5,274,801 | * | 12/1993 | Gordon et al. | 707/3 |
| 5,319,543 | * | 6/1994 | Wilhelm | 705/3 |
| 5,355,445 | * | 10/1994 | Shibao et al. | 706/50 |
| 5,359,509 | | 10/1994 | Little et al. . | |
| 5,377,308 | | 12/1994 | Inoue et al. . | |
| 5,404,292 | | 4/1995 | Hendrickson . | |
| 5,406,477 | | 4/1995 | Harhen . | |
| 5,412,756 | * | 5/1995 | Bauman et al. | 706/45 |
| 5,434,952 | | 7/1995 | Yen et al. . | |
| 5,442,731 | | 8/1995 | Tanaka et al. . | |
| 5,467,265 | | 11/1995 | Yamada et al. . | |
| 5,475,589 | | 12/1995 | Armitage . | |
| 5,517,405 | | 5/1996 | McAndrew et al. . | |
| 5,550,746 | | 8/1996 | Jacobs . | |
| 5,563,805 | | 10/1996 | Arbuckle et al. . | |
| 5,583,758 | | 12/1996 | McIlroy et al. . | |
| 5,586,218 | | 12/1996 | Allen . | |
| 5,594,837 | | 1/1997 | Noyes . | |
| 5,615,112 | | 3/1997 | Liu Sheng et al. . | |
| 5,622,171 | | 4/1997 | Asada et al. . | |
| 5,630,127 | | 5/1997 | Moore et al. . | |
| 5,644,686 | | 7/1997 | Hekmatpour . | |
| 5,659,724 | | 8/1997 | Borgida et al. . | |
| 5,672,154 | | 9/1997 | Sillen et al. . | |
| 5,673,369 | | 9/1997 | Kim . | |
| 5,692,106 | | 11/1997 | Towers et al. . | |
| 5,720,007 | | 2/1998 | Hekmatpour . | |
| 5,720,008 | | 2/1998 | McGuinness et al. . | |
| 5,720,009 | | 2/1998 | Kirk et al. . | |
| 5,722,418 | | 3/1998 | Bro . | |
| 5,724,968 | | 3/1998 | Iliff . | |
| 5,737,728 | | 4/1998 | Sisley et al. . | |
| 5,748,943 | | 5/1998 | Kaeppe et al. . | |
| 5,960,404 | * | 9/1999 | Chaar et al. | 705/8 |
| 5,978,785 | * | 11/1999 | Johnson et al. | 706/54 |
| 6,003,011 | * | 12/1999 | Sarin et al. | 705/9 |

* cited by examiner

Fig 3

| | Domain | S1 | S2 | S(n) |
|---|---|---|---|---|
| 1 | | | | |
| 2 | D1 Demographics | Name | Address | Tel. |
| 3 | D2 Income | Individual's | Household | Other sources |
| 4 | D3 Diagnoses | Disease 1 | Disease2 | Disease (n) |
| 5 | D4 Medications | Med1 | Med(n) | |
| 6 | D5 Interventions | Int. 1 | Int.(n) | |
| 7 | D6 Functional Status | ADL? | Transport | Nutrition |
| 8 | D7 Caregivers | Hospital | Clinic | Home |

Fig. 4a

| | D1 | D2 | D3 | D6 |
|---|---|---|---|---|
| 1 | | | | |
| 2 | S1 Name | S1 Individual's | S1 Diabetes Mellitus | S1 Activities of Daily Life |
| 3 | S2 Address | S2 Household | S2 High Blood Pressure | S2 Transportation |
| 4 | S3 Home Telephone | S3 Other | S3 Rheumatorid Arthritis | S3 Nutrition |
| 5 | S4 Work Telephone | ... | S4 Asthma | S4 Mobility |
| 6 | S5 Date of Birth | | ... | ... |
| 7 | S6 Gender | | | |
| 8 | S7 Marital Status | | | |

Fig. 4b

S2 Address Apt? Single family home? Stairs?

Fig. 5

| | Sentinel Data 20 | Suggested Activities 21 |
|---|---|---|
| 1 | | |
| 2 | Age greater than 80 is pre-op risk | Refer to PCP for pre-op consult |
| 3 | Diabetes diagnosed presents pre-op risk | Refer to PCP for pre-op consult |
| 4 | Asthma diagnosis presents pre-op risk | Refer to PCP for pre-op consult |
| 5 | Requires translator | Refer to social worker |
| 6 | Requires spouse to bring to hospital | Refer to social worker to call spouse |
| 7 | Pre-surgery patient education incomplete | Review checklist with patient & family |

30

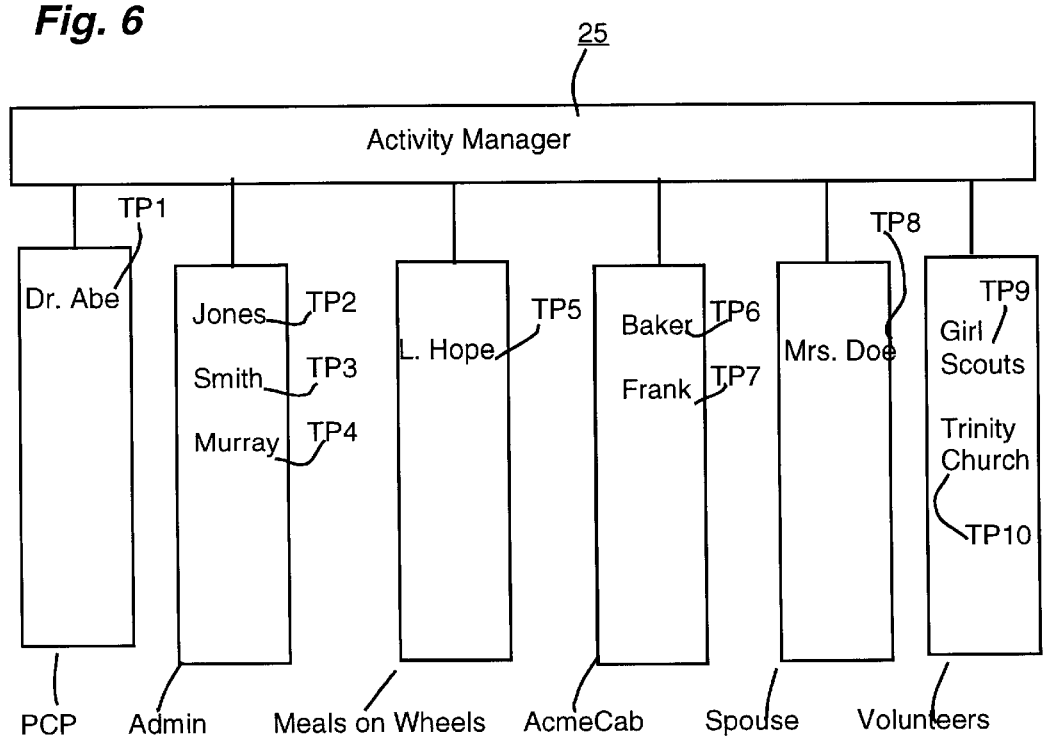

| 1 | Task Performer | Notify by | Action(s) | |
|---|---|---|---|---|
| 2 | PCP | email | Morning rounds check | X |
| 3 | Nursing staff | email | Change IV drip every 6 hours | X |
| 4 | Candystriper | fax | Take patient to bathroom at 8am, every 2 hrs till 10pm | XX |
| 5 | Pharmacist | fax | Prepare meds | X |
| 6 | Nursing staff | email | Administer meds every 4 hours | |

*Fig. 7b*

| 1 | Task Performer | Notify by | Action(s) | |
|---|---|---|---|---|
| 2 | aide | email | Call Patient each day for glucose test results, key in | XX |
| 3 | Activity mgr lab | keyboard | Analyze lab results, report exceptions, alarms | XX |
| 4 | Lab supervisor | email | Review lab analysis reports, alarms, signal action | X |
| 5 | Pharmacist | fax | Prepare new Prescription | X |
| 6 | Church Volunteer | Telephone | Help with banking | |
| 7 | Meals on Wheels | Fax | Deliver Meals daily for a week | |
| 8 | Courier | Telephone | Pick up prescription at Pharmacy, deliver | |

*Fig. 7c*

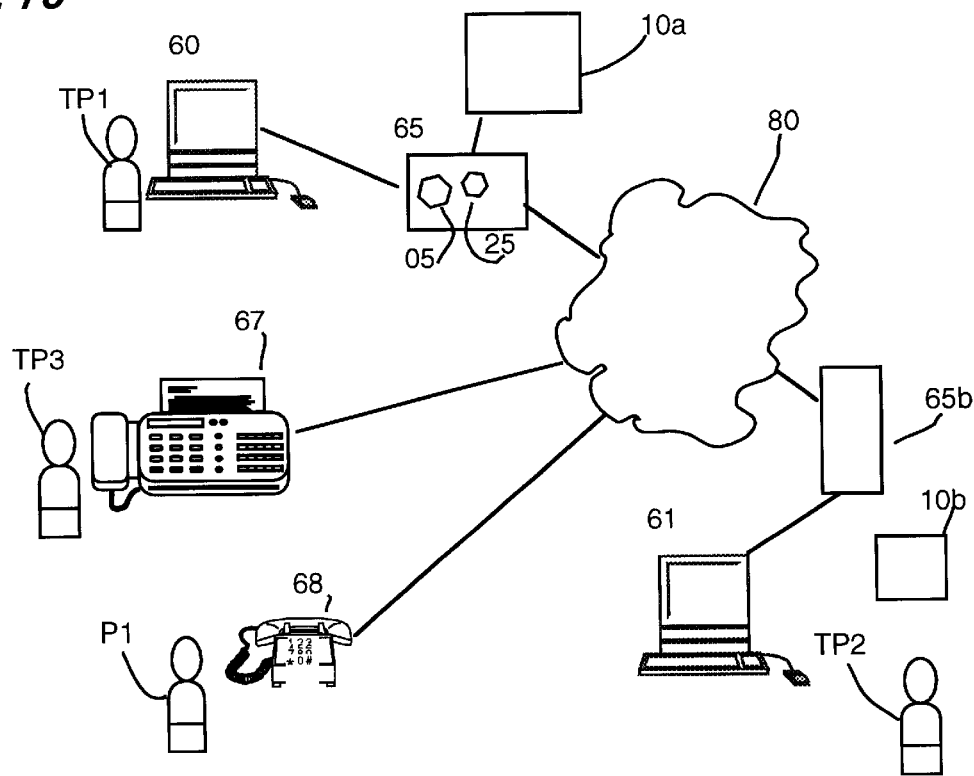

*Fig. 8b*

| | Disease | Impairment | Disability | Handicap |
|---|---|---|---|---|
| 1 — | | | | |
| 2 — | Osteoporosis | Hip fracture | Cannot walk | Needs services |
| 3 — | Atherosclerosis | stroke | cannot self-care | Needs homecare |
| | | | | |
| | | | | |
| | | | | |
| | | | | |

Geriatric Screening ☒

Input Form Healthcare  [OK]

Patient Name: John Doe          Phone Number (888) 555-5555

- Can you bathe without assistance?  ● Yes  ○ No
- Has a doctor told you that you have Heart Disease?  ● Yes  ○ No
- Has a doctor told you that you have Diabetes?  ● Yes  ○ No
- Do you feel sad or depressed more than occasionally?  ○ Yes  ○ No
- Are you younger than 75?  ○ Yes  ● No
- Have you been in the hospital overnight during the last 12 months?  ● Yes  ○ No
- How would you rate your overall health?  [Excellent ▼]

Second Screen ☒

Detailed questions--self care  [OK]

Patient Name: John Doe          Phone Number (888) 555-5555

1. Patient able to groom him/her self?  ● Yes  ○ No
2. Patient able to walk?  ● Yes  ○ No
3. Has patient fallen in last 6 months?  ○ Yes  ● No
4. Any problem with access to food?  ○ Yes  ● No
5. Problem with IADL?  ● Yes  ○ No

[Next ▼]

| | Facility Resource | ☒ |

Healthcare Facility Resource

Facility type: Skilled Nursing  Name: Hilldale Nursing

Procedures and Facilities

| | | | |
|---|---|---|---|
| Ventilators | Maintenance Nasal, Mask, Bipap | Narcotics | O Yes ● No |
| Oxygen | | IV: | Yes:IV Push available |
| Tracheotomy | ● Yes O No | | |
| Swallow evaluation | Bedside | Central Lines: | ● Yes O No |
| Suction | ● Yes O No | TPN: | ● Yes O No |
| Dialysis | Offsite | Tube Feeding | O Yes ● No |
| Cardiac Monitoring | Telemetry TB | Respiratory Therapy | BiPap Vents |
| Isolation | ● Yes O No | Traction | ● Yes O No |
| Oximetry | O Yes ● No | CPM: | ● Yes O No |
| Lab work | Onsite | Orthotics/ Prosthetics | Offsite |
| X-ray | ● Yes O No | Special beds: | ● Yes O No |
| Ultrasound | | Mechanical lifts | ● Yes O No |
| Bladder ultrasound | ● Yes O No | | |
| | | Podiatry | O Yes ● No |

Comments

| | Patient Transfer | ☒ |

Current Facility: Acute Hospital    Desired: Skilled Nursing

Patient Needs

- Ventilators    Maintenance
- Oxygen    Nasal
- Tracheotomy    ☐
- Swallow evaluation ☐
- Suction    ☐
- Dialysis    ☐
- Cardiac Monitoring ☐
- Isolation    ☐
- Oximetry    ☐
- Lab work    ☐
- X-ray    ☐
- Ultrasound    ☐
- Bladder ultrasound ☐

Narcotics    ☐
IV:    ☐
Central Lines:    ☐
TPN:    ☐
Tube Feeding    ☐
Respiratory Therapy ☐
Traction    ☐
CPM:    ☐

Comments

| | |
|---|---|
| | CarePlan |

FOR : John Doe          Phone Number (888) 555-5555

| | |
|---|---|
| Age greater than 80 is pre-op risk | Refer to PCP for pre-op consult |
| Diabetes diagnosed presents pre-op risk | Refer to PCP for pre-op consult |
| Asthma diagnosis presents pre-op risk | Refer to PCP for pre-op consult |
| Requires translator | Refer to social worker |
| Requires spouse to bring to hospital | Refer to social worker to call spouse |
| Pre-surgery patient education incomplete | Review checklist with patient & family |

Comments:
1. Referred patient to Dr. Smith for further evaluation of risk and perioperative plan regarding obesity, asthma and angina.
2. Patient referred to Discharge Planning Department at HHH to assure home services for disabled wife while patient is in hospital and recovering from surgery.
3. Scheduled pre-op education with Hometown Rehab May 15.

1 ———— Provider Report
2 ———— CHF Severity 4

| Provider | Acute adm/pat | Hosp.days/pat | SNF days/pat | Total days/pat |
|---|---|---|---|---|
| W. Doe, M.D. | 3 | 24 | 0 | 24 |
| Midstate Assoc. | 2 | 8 | 6 | 14 |
| Atlantic Health | 1 | 4 | 10 | 14 |
| B. Smith, M.D. | 3 | 15 | 9 | 24 |

(rows 3–7; columns 8, 9, 10, 11)

1 ———— Task Performer Report for Q4 97

| Performer | No. Patients | Pending activities | Activities Overdue (%) |
|---|---|---|---|
| Able, J. | 200 | 15 | 0 percent |
| Baker, B. | 350 | 25 | 50 percent |
| Charles, C. | 160 | 12 | 0 percent |
| Dogg, D. | 200 | 10 | 0 percent |
| Edward, E. | 100 | 0 | 0 percent |
| Frank, F. | 75 | 0 | 0 percent |
| George, G. | 350 | 30 | 50 percent |
| Harold, H. | 275 | 20 | 25 percent |
| Total | 1710 | 112 | 29 percent |

(rows 2–11; columns 12, 13, 14, 15)

Fig. 9i

Delay Days Report for Q4 97 by Physician at P.C.

| Physician | No. Pat. | #Pats. Del | DelayDays | 1 | 2 | 3 | 4 | 5 | 6 | 7 |
|---|---|---|---|---|---|---|---|---|---|---|
| Alpha, A | 22 | 0 percent | | | | | | | | |
| Beta, B | 35 | 0 percent | | | | | | | | |
| Charlie, C | 16 | 50 percent | 20 percent | | 4 | 4 | | | | |
| Delta, D. | 5 | 20 percent | 10percent | | | | | 1 | | |
| Elba, E | 86 | 10 percent | 25 percent | | | 3 | | 2 | | 5 |
| Fox, F. | 40 | 0 percent | | | | | | | | |
| Gamma, G | 19 | 0 percent | | | | | | | | |
| Halo, H | 50 | 10 percent | 20 percent | 5 | | | | | | |
| Iota, I | 12 | 50 percent | 50 percent | | | 3 | 3 | | | |
| James, J | 18 | 0 percent | | | | | | | | |
| Total | 303 | | | | | | | | | |

Documented Delay day Reasons:
1. No written Physician order
2. Physician didn't complete paperwork
3. No available bed
4. Insurance related
5. Family related
6. No admission assessment
7. Other

Examples of Sentinel Data in Healthcare

Physiology:
    Diabetes = hemoglobin A1c
    Lungs(COPD) =Fev1, inhaler refill frequency, oxygen
        use and type
    CHF = Weight Psychosocial
    Depressed? (as evidenced by screen-GDS)
    Enough money to meet basic needs?
Function
    Transportation--able to make healthcare appts?
    Mobility--fallen in last 6 months?able to climb stairs?
    Nutrition--problem with access to food?
    ADL Problem with any
        Instrumental Activity of Daily Living?

Fig. 15

Sentinel Data 20 in different individuals-Healthcare

| | | Frail Elderly | Middle Aged Diabetic | Young Asthmatic |
|---|---|---|---|---|
| 1 | | Frail Elderly | Middle Aged Diabetic | Young Asthmatic |
| 2 | Physiology | Medical History | Medical History | Medical History |
| 3 | | Labs | Labs | Labs |
| 4 | | Chem Panel | Chem Panel | Chem Panel |
| 5 | | | Hemaglobin a1 c | Allergy Panel |
| 6 | | | Microalbumin | |
| 7 | | Diagnostic Tests | Diagnostic Tests | Diagnostic Tests |
| 8 | | Echo Cardiogram | Retinal Eye Exam | Pulmonary Function |
| 9 | | Bone Densitometry | | |
| 10 | Psychology | Depression | Depression | Anxiety |
| 11 | | Cognition | Anxiety | |
| 12 | Social | Living w. healthy other | Significant other trained | Person trained to |
| 13 | | | to recognize hypoglycemia | monitor lung function & |
| 14 | | | & treat | adjust medication |
| 15 | | Living with frail other | | |
| 16 | | Access to transportation | Finances for glucose | |
| 17 | | | monitoring equipment | |
| 18 | | Finances | | |
| 19 | | | | |

Fig. 17a
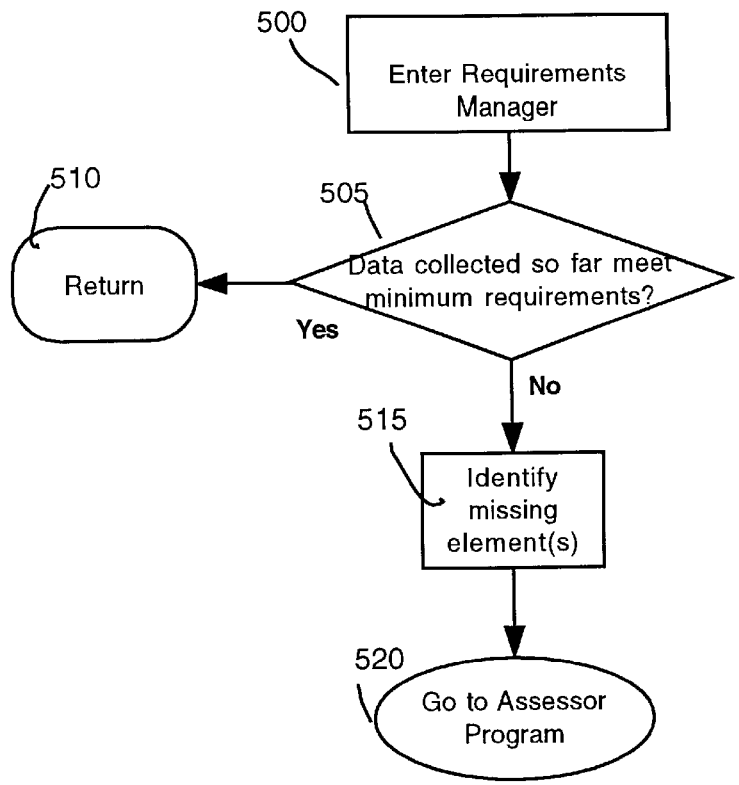
Fig. 17b
| | Next State | Req1 | Req2 | Req3 |
|---|---|---|---|---|
| 1 | Lab Work | Age | Gender | Diagnosis |
| 2 | Trans. Resourc | Insurance | Income | Location |
| 3 | Vaccine History | Age | Gender | Diagnosis |
| 4 | Pharm. Resource | Diagnosis | Prescription | Other meds |
525
Fig. 17c
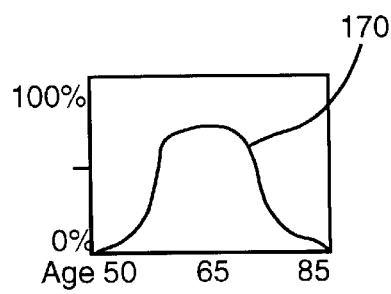

SYSTEM FOR MANAGING APPLIED KNOWLEDGE AND WORKFLOW IN MULTIPLE DIMENSIONS AND CONTEXTS

BACKGROUND OF THE INVENTION

Technical Field

This invention relates generally to the field of computerized knowledge engineering and expert systems and more particularly to computer systems for managing applied knowledge, decision making, risk assessment, and workflow iteratively amongst several dimensions and contexts.

Background

In many areas of endeavor, one or more bodies of knowledge exist about conditions or circumstances which might affect human lives. For example, in health care, a considerable amount of clinical knowledge is available in electronic form about various diseases and the treatments for each. Similarly, in educational systems significant information exists about intelligence and academic performance indicators and ways to encourage achievement. In commercial marketing, demographics data can be gathered and stored electronically about buyers and their preferences, so that marketing can be done and targeted to prospective buyers with similar characteristics. However, a major problem with such systems is that they are usually limited in scope to one or two dimensions and do not take into account contextual information or other bodies of knowledge that might affect the outcome. They also tend to be limited in their ability to provide plans for actions, assign individuals to carry out the actions, and their ability to manage the workflow and follow-up on the actions when multiple tasks and individuals are involved.

For example, in health care systems, in early computer applications, simple databases were created to store information about diseases and differential diagnosis. An attending physician would have to suspect the existence of one or more diseases and check for those in the database. Now automated expert systems embody the experience of one or more diagnostic physicians. Such an expert system helps the attending physician diagnose an illness, often by asking a number of questions of the attending physician about the patient. Such systems help in diagnosing and treating an individual. However, they are still operating only in the dimensions of diagnosis and immediate treatment. U.S. Pat. No. 5,583,758, to McIlroy et al., describes a health care management system which selects treatment guidelines from a data base of diagnosed conditions, and enables a user to propose alternative treatments, which the system will then compare with the system recommended treatment and submit to another health care provider for review and approval.

McIlroy and similar expert systems assume there is one primary disease in question which needs diagnosis or treatment. However, as is often the case for the elderly, multiple diseases may be present in the same individual. One patient might have diabetes, a heart condition, and a respiratory system problem. The systems that allow a user to describe a patient having multiple ailments often require that the same information be entered redundantly about the patient for each disease. Even systems that might take this into account do not consider the patient's life circumstances and tendencies. An outpatient care plan for an elderly male with multiple diseases may be prone to failure if it relies on self-administration of a complex schedule of medications together with frequent trips to a physical therapy facility across town. This is so especially if the man is recently widowed, lives alone, and is poor. Such an individual may not be motivated or able to follow the medication schedule and may not have the resources or assistance needed to get to the therapist's office.

Yet the same outpatient plan might work for a married man of reasonable means whose wife is both healthy and able to drive him to and from the physical therapist's. Systems which focus only on diagnosis and treatment, even for patients with multiple diseases usually do not take these life circumstance factors into account.

Not only do most systems that make use of knowledge bases have limitations in scope, they also tend to be non-iterative or non-recursive. That is, little or no follow-up is done using the data that was used at first. In the above example, most systems do not have a way to check up or record the fact that the care plan was or was not followed and then plan the next step accordingly.

Another defect of many existing systems is that they are designed for only one or two types of participant-actors or task performers. In health care again, a system may be designed for physicians or pharmacists, but not include activities and analysis for nurses, therapists, aides, home caregivers, and administrators. Thus, the system is not able to reflect all that needs to be done or has been done for a given patient. Such a system might record that a doctor has diagnosed a condition or that the pharmacist has prescribed for it, but the system is not designed to ask a caregiver to give the medication or an administrator to arrange for transportation. At best, some systems will enable nurses or administrators to review the patient records.

Until recently, there had been little impetus to develop more comprehensive systems, since many of the computerized bodies of knowledge were used in industries where fees were charged by service. Health care in many countries used to be primarily fee for service. Health Maintenance Organizations (HMO's) and other health care systems and providers have changed the fee structure in many countries to a flat or fixed fee structure, in which resources must be used as efficiently as possible.

Other corporate structures have also changed recently to more resource-conscious methods of working, as well. In school systems, the tools which allow school administrators to identify high achievers or low achievers are usually not tied to systems which manage resources or interventions. As school budgets come under increased pressure, with fixed per pupil per year budgets, interventions must be done with optimum resource usage in mind. In many corporate structures, the focus on resources also includes a greater emphasis on delegation (where allowed) and teamwork. In commercial businesses, many middle management positions have been eliminated in favor of delegating more responsibility to the employees. Nurse practitioners now often do some of the preliminary fact gathering for physicians in HMO's. This change of focus from results-only to results and best quality use of resources means that many existing computerized or information technology (IT) expert systems or knowledge databases do not adequately address resource usage.

Another stumbling block in the development of more comprehensive systems has been the need for accountability and record keeping in many industries. Health care, again, is a good example. To avoid errors and malpractice claims, most systems need to permanently record diagnoses, prescriptions and actions taken, and insure that the electronic records cannot be changed at a later date. Frequently this is done in a patient database that is separate from most other systems or databases. Records in the patient database usually serve only one or two purposes. First, they permanently record the diagnosis made and care given. Second, they may be used in bill preparation.

Expert systems are usually not linked or related to other systems, since the expert systems were developed for one-dimensional use, such as diagnosis, or for computer application software support. As the name implies, an expert system is usually based on the expertise of one individual or type of individual, such as a diagnostic physician. Expert systems for differential diagnoses (with a few exceptions for occupational diseases) usually do not take into account any other aspects of the patient's life circumstances, since they are not likely to be relevant to a proper diagnosis. Similarly, pharmaceutical expert systems focus on matters such as drug interactions and drug toxicity, but not whether the patient is likely to have a spouse (who can help with the medication schedule) or transportation. U.S. Pat. No. 5,563,805, to Arbuckle et al., describes a network for linking different types of computer software application experts over a network in which each expert has available to him or her some help data on a computer. However, this does not integrate any of the work, knowledge bases or follow-up and is essentially a way of screening or directing a caller to a certain type of human expert.

Expert systems and knowledge bases have also been built using neural network technology, in which elements which are initially connected in a random or hypothetical mix are molded by operational feedback into a pattern that produces better and better results, so that the computer system "learns" in a sense. U.S. Pat. No. 5,622,171, to Asada, et al., 1997, for example, describes a system for differential diagnosis based on clinical and radiological information using artificial neural networks. Here, too, however, the new knowledge that is learned is related to one particular type of expertise, namely the dimension of differential diagnosis.

Actions that are taken based on the use of such expert systems or knowledge bases are also usually limited to the field of expertise in question. Even in the Arbuckle patent, discussed above, the different "experts" were experts in different parts of a single computer application program, using help knowledge about that part of the program, not experts as diverse as a physician and a physical therapist. If the expert system is a diagnostic system, the physician will complete a diagnosis and possibly prescribe treatment. If the expert system is a pharmaceutical one, a drug dosage report and interaction warning might be the resultant action. Similarly, other expert systems or knowledge base systems such as those used in school systems, or manufacturing, or engineering are usually designed to incorporate one particular type of action for performance by someone with one type of skill level.

The shift in emphasis from a fee for service, unlimited resource business model to a fixed budget, managed resource one also means that more emphasis needs to be placed on analyzing the actions and nature of the consumers of the service or resource. Here the Pareto principle or "80/20" rule often comes into play.

In health care organizations for example, it is very likely that only 20 percent (or fewer) of the members use 80 percent (or more) of the resources. One way to address this in the early stages of market penetration by a health care organization is to continue to enroll new members, to bring in new fees and subsidize that 20 percent using the resources. As the market penetration increases, it becomes advisable to merge with other similar organizations in order to reduce administrative overhead costs. When market penetration is optimal, however, new revenue sources are less likely to be found, and traditional cost savings through mergers and acquisitions are less likely, so the subsidies for the high resource users begin to diminish. Another phenomenon also tends to occur as the health care organization matures, namely, its members tend to age and require more health care services.

One way to control costs is by analyzing the services provided to those 20 percent who consume 80 percent of the resources. Unfortunately, most of the installed systems have not been designed to assist in his approach to providing resources more efficiently. Instead, some health care providers analyze existing patient database printouts manually or use statistical analysis software to see if they can find correlations that help in screening or identifying individuals who might be at higher risk for using more resources. Others conduct surveys to try to collect such information. Short surveys may not collect enough data about the individuals to provide useful information. Detailed surveys, on the other hand, are often expensive to compile and analyze and still may not provide useful data.

Very often, the factors that may be most likely to affect resource usage are not captured in any of the databases or surveys. In the example of the widowed elderly male described above, most systems and surveys will not have recorded all the facts about his current life circumstances. His records may show that he is single, but they will probably not indicate that he was recently widowed, is poor, and has no home caregiver or relative nearby to assist him. If the institution has not captured the data about all the factors that may affect outcomes, it is hampered in trying to optimize resources.

Fewer still are the institutions that are able to propose activities they wish to take to minimize unnecessary resource usage by the "20 percent." For the elderly male, again, once these life factors are correlated with a higher risk that he will use more resources, what should the institution do? If this patient is more likely to use ambulances and emergency care facilities and require hospitalization, what steps can the heath care organization take to lower those risks?

Even as some clinicians and care providers develop manual ways to assess these risks and recommend interventions, existing disease management expert or knowledge base systems are not designed to make use of this data. For example, the hypothetical expedient of providing free shuttle bus services to outpatients might have a significant impact on resource usage, but existing systems are usually not able to identify the patients who are most likely to need this. Nor can existing systems create the care plans and workflow that will insure the shuttle bus stops at the elderly male's home every Monday morning at 9 am to take him to the doctor's.

While computers have inspired and enabled the development of expert systems and knowledge bases, they have tended to impose rigid structures on data. For example, one way to collect information about patients is through the use of relational databases. In a relational database there are tables which describe the types of records or files that are included. For example, one table may describe patient name and address records in a predefined format. Another may describe admission records. Another table may list diagnoses. The "relations" between these tables are usually described in a master table which shows how a patient record may be linked to admissions records and diagnoses records. If new kinds of information are to be collected about the patient, new record types must be added or fixed fields must be redefined and the various affected tables must be updated or changed. This is often time consuming and costly for information technology (IT) staff personnel to implement. Thus, most information collected is stored in static formats in pre-defined record or table fields.

In actuality, however, the amount and kinds of data that need to be collected about an individual may vary over time. Using health care again, immediately after a heart attack and bypass surgery, more information about clinical care and treatment needs to be collected while the patient is recovering in hospital. As the patient is ready to be released, information about home circumstances becomes more relevant. Home circumstances may change again if the patient's wife dies while the patient is still recovering at home.

Existing systems do not usually accommodate the ongoing collection and expansion of such information, particularly when unforeseen events such as the wife's death occur. Not only do most systems find it difficult to capture such information, they are also not able to make use of it in changing workflow and action assignments. For example, this patient may now need a shuttle bus or similar service to bring him in for checkups.

It is an object of this invention to provide a system for managing applied knowledge bases in multiple dimensions.

It is another object of the present invention to integrate workflow management with the management of applied knowledge bases.

Still another object of the present invention is simplifying the integration of new domains of knowledge and information into the system.

SUMMARY OF THE INVENTION

These and other objects are achieved by a computer system for managing applied knowledge and workflows in multiple dimensions and contexts which includes: an assessor program for screening subjects and collecting, assessing and creating objects to represent the subjects using flexible domain and subdomain descriptors; a system manager for identifying sentinel data; and at least one activity manager for creating and managing activity plans and completions for various types of task performers. In a preferred embodiment, the assessor program is able to interactively collect data about a subject and classify the information into a number of domain descriptors. Each object domain descriptor, in turn may have several subdomain descriptors, which the assessor program determines apply to this object. The system manager uses applied knowledge databases to identify which sets or subsets of domain and subdomain descriptors for an object are significant for the overall assessment and system purposes and identifies these as sentinel data. These sentinel data, in turn, are analyzed by the system manager according to the knowledge database(s) to determine what, if any, activities to take to lower risks or maximize resource usage. Activities range from doing nothing, to modifying the object (individual), modifying the object's (individual's) environment or some combination of these. The system manager develops one or more plans which are turned over to one or more activity manager programs. In a preferred embodiment, the activity managers assign tasks to responsible task performers, notify them of the tasks to be done, verify completion of the tasks, and possibly initiate re-assessments. Reports can also be created by other manager and agent programs in the system. In a preferred embodiment, object domains and subdomains can be added, deleted or modified easily while still maintaining the time integrity of the data for record keeping. Similarly, resources and activities can be added or changed readily.

It is an aspect of the present invention that it provides a comprehensive system for using several different types of distributed knowledge bases as part of a cohesive whole.

It is another aspect of the present invention that the suggestions derived from an assessment and the knowledge bases can be translated into tasks.

Still another aspect of the present invention is that tasks can be assigned to various types of skill levels, depending on the nature of the task and the individual's skins.

Yet another aspect of the present invention is that it enables a complete workflow to be developed and implemented based on a risk assessment and analysis of a number of factors in context.

Still another aspect of the invention is that it improves the likelihood of taking the right actions at the right places and times using the right level of resources.

Another aspect of the invention is that it can be used to improve desired outcomes while decreasing resource costs or usage.

BRIEF DESCRIPTIONS OF THE DRAWINGS

FIG. 3 is a table of illustrative patient domains for a health care implementation of the invention.

FIGS. 4 and 4a are tables of illustrative subdomains for patient domains in a health care implementation of the invention.

FIG. 5 is a table showing illustrative sentinel data and suggested health care activitie produced by the invention.

FIG. 6 is a schematic drawing of an activity manager of the present invention.

FIGS. 7a and 7b are tables illustrating health care plans for individuals after tasks have been assigned by an activity manager of the invention.

FIG. 7c is a schematic diagram showing communications by an activity manager to task performers over a network using the invention.

FIG. 8b is a block diagram of the World Health Organization's treatment model.

FIG. 9b schematic drawing of a screen display of the invention.

FIG. 9c is a schematic drawing of a screen display of the invention.

Figure 1:
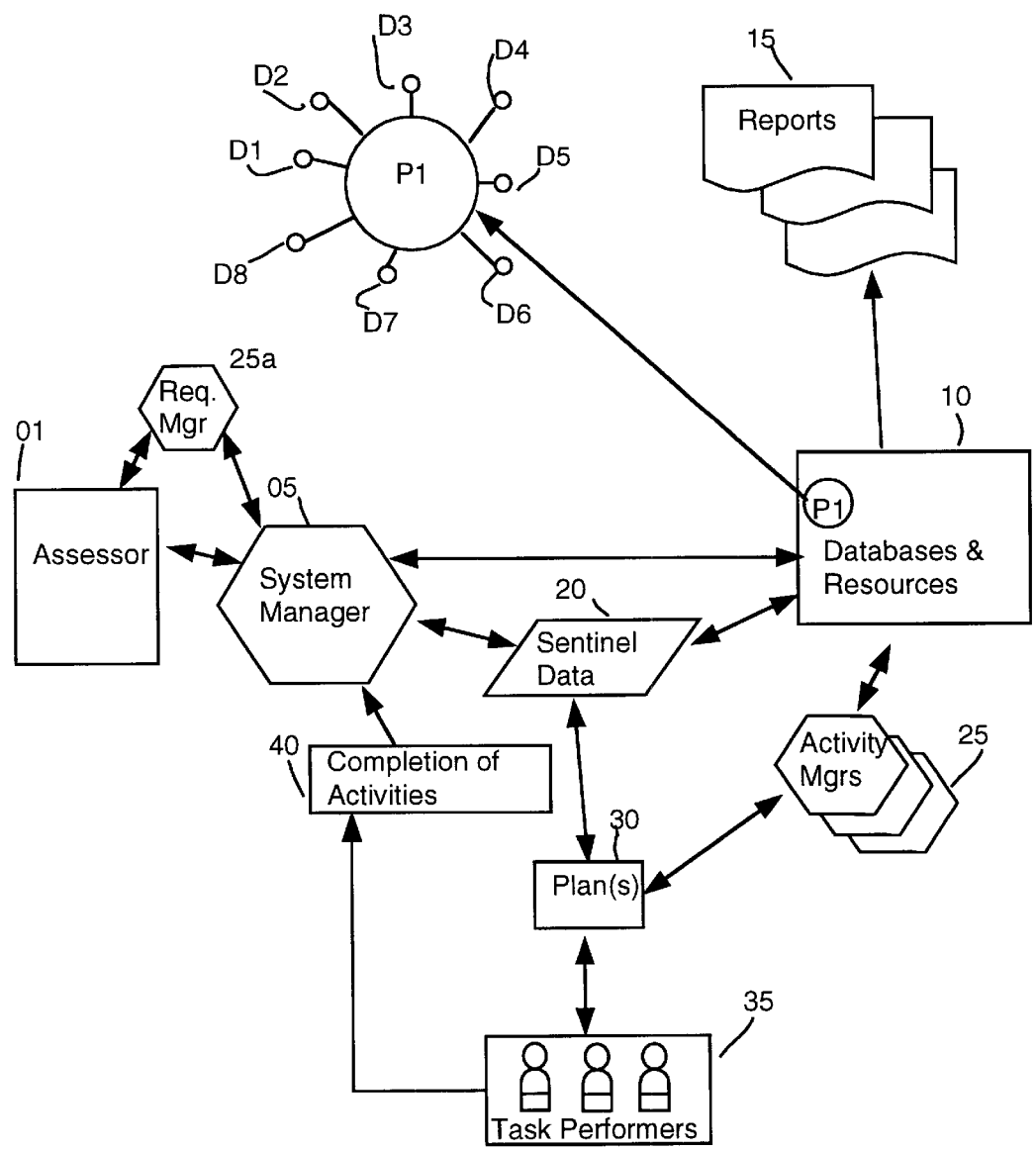
FIG. 1 is a schematic drawing of the main elements of the invention.

FIG. 9d1 is a schematic drawing of a screen display of the invention.

FIG. 9d2 is a schematic drawing of a screen display of the invention.

FIG. 9e is a schematic drawing of a screen display of the invention.

Figure 9A:
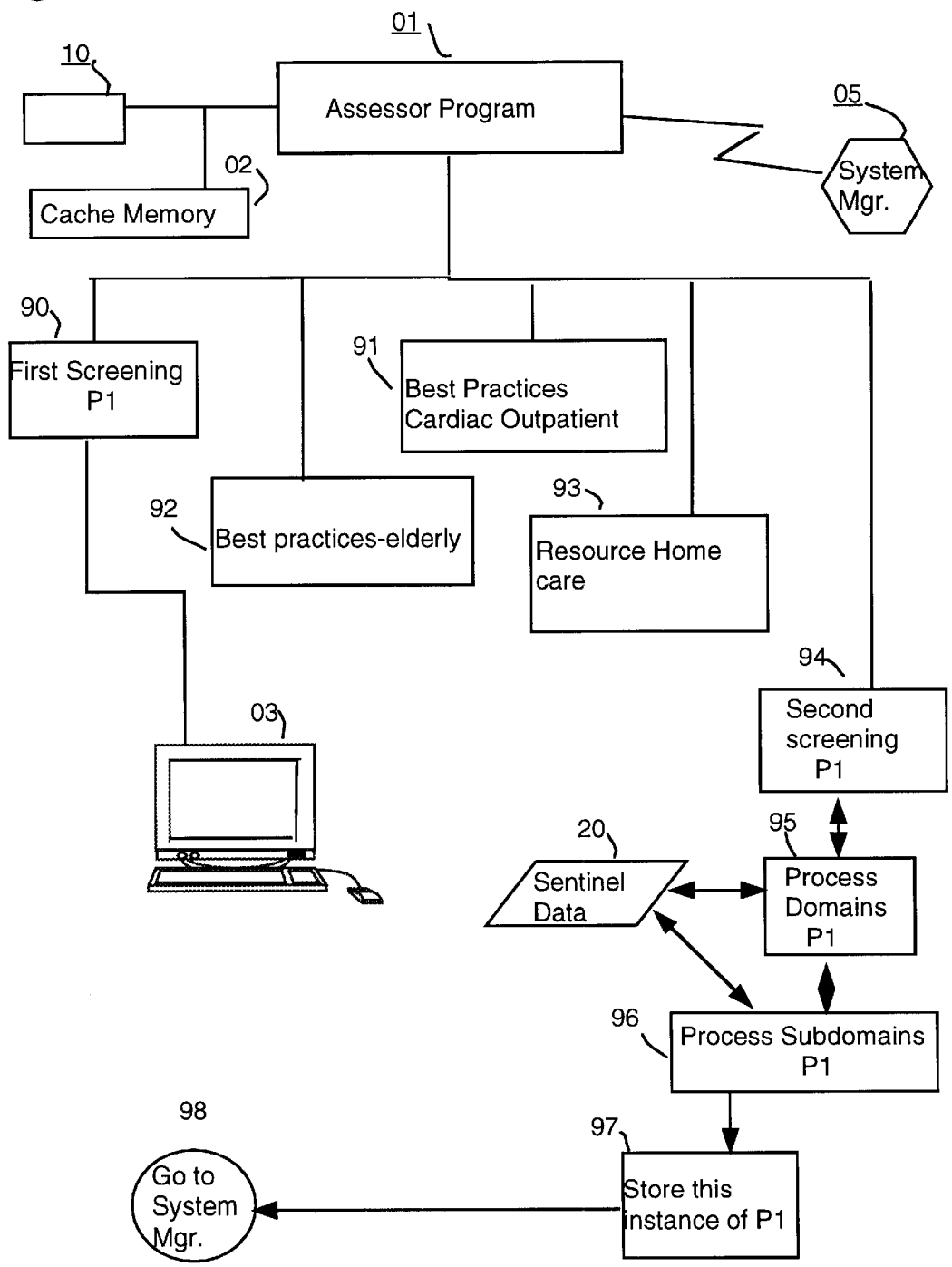
FIG. 9a is a flow diagram of an assessor program of the invention.
Figure 9F:
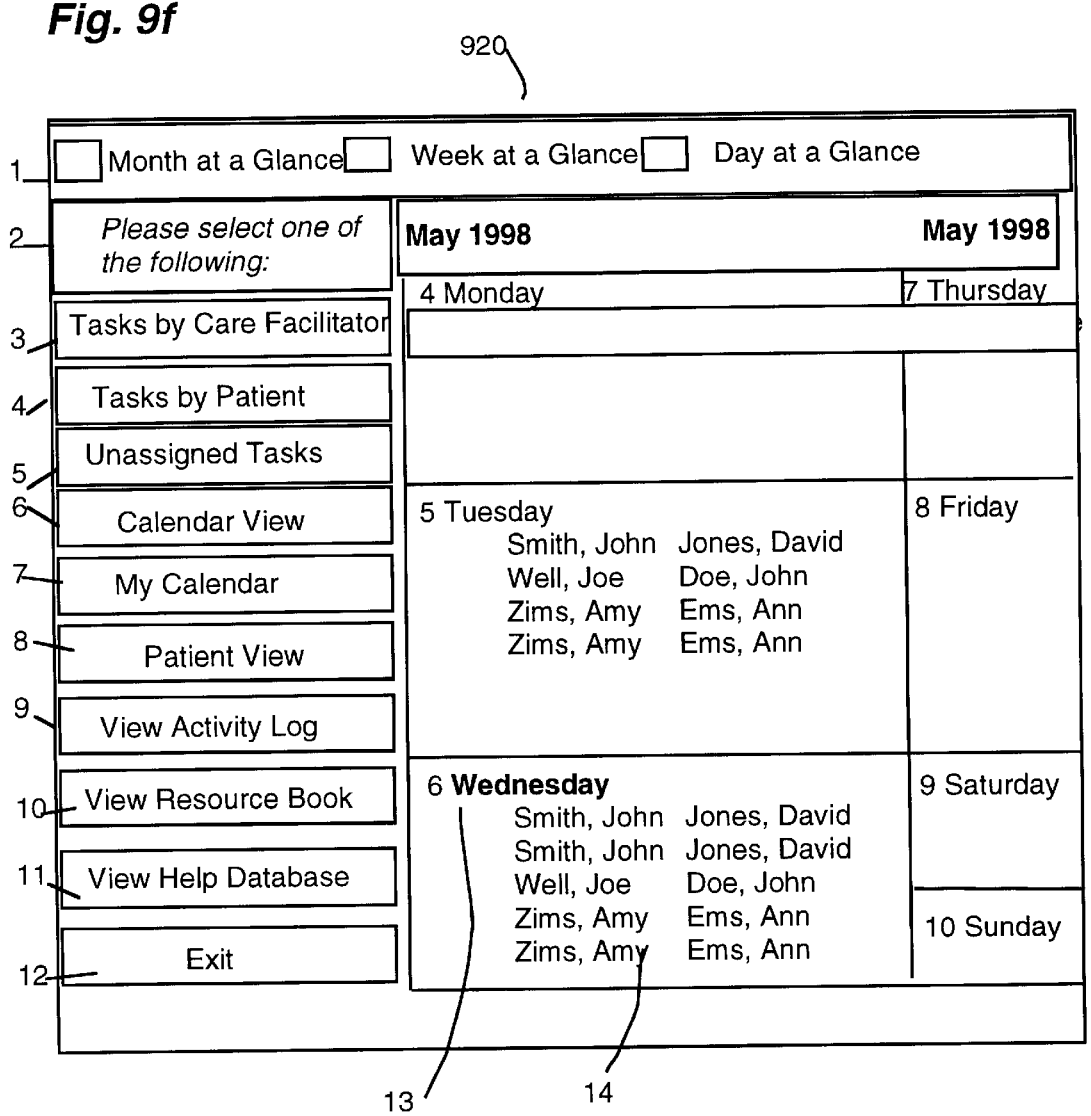

FIG. 9f is a schematic drawing of a screen display of the invention.

FIG. 9g is a schematic drawing of a screen display of the invention.

FIG. 9h is a schematic drawing of a screen display of the invention.

FIG. 9i is a schematic drawing of a screen display of the invention.

Figure 10:
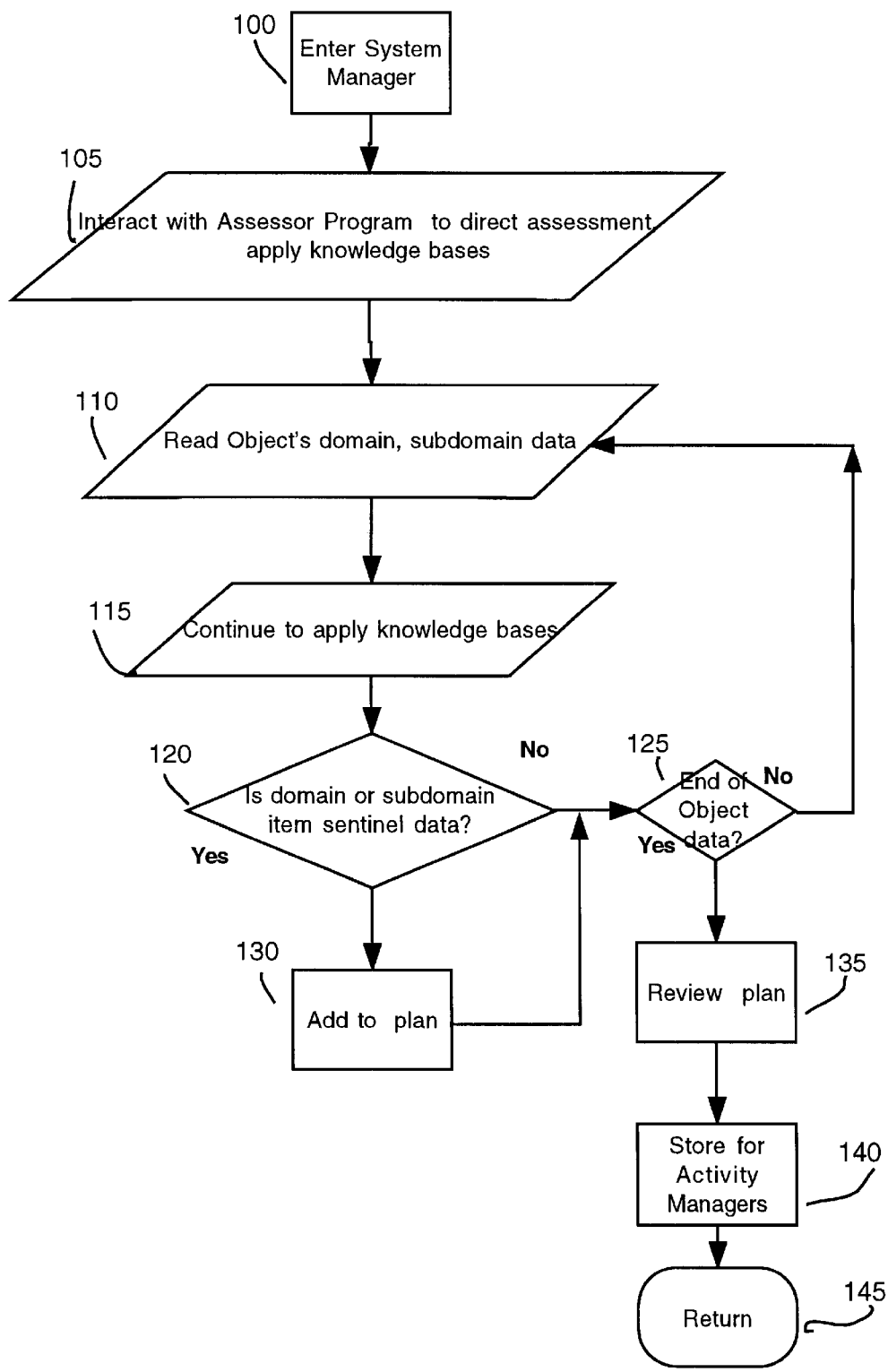

FIG. 10 is a flow diagram of the system manager of the invention.

Figure 11:
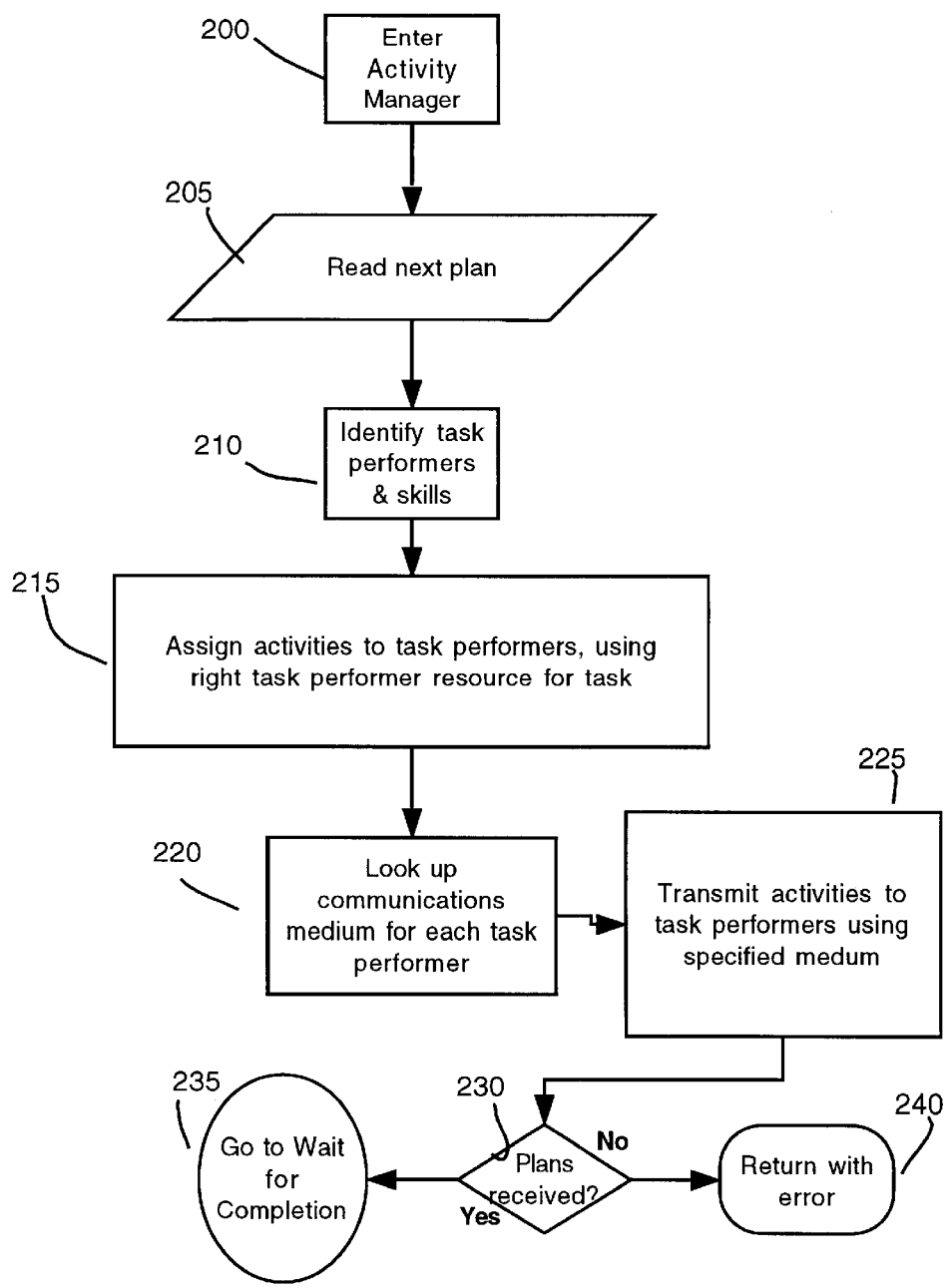

FIG. 11 is a flow diagram of the initializing work of an activity manager of the invention.

Figure 12A:
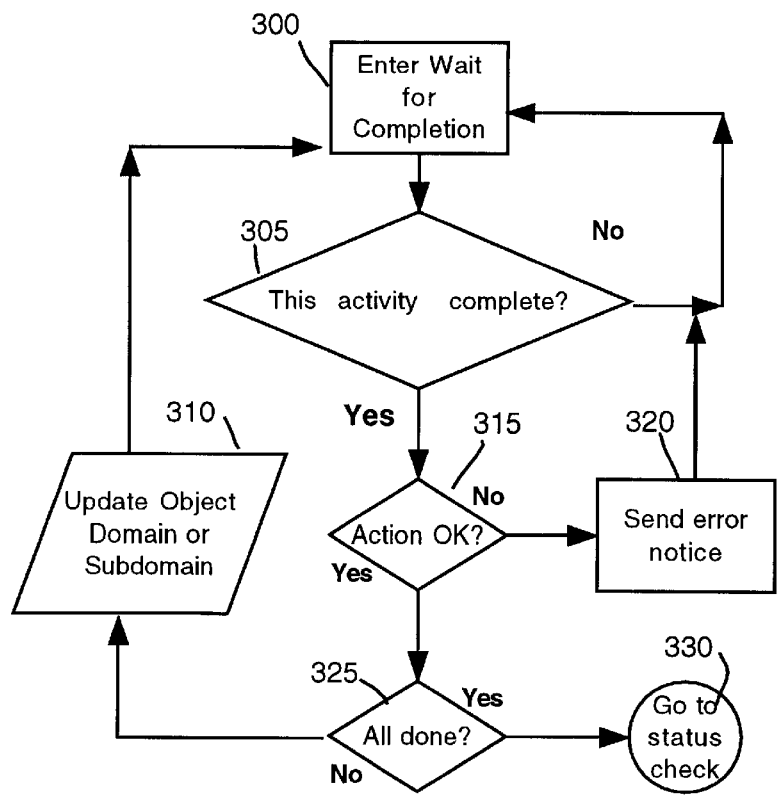

FIG. 12a is a flow diagram of an activity manager waiting for task completions.

Figure 12B:
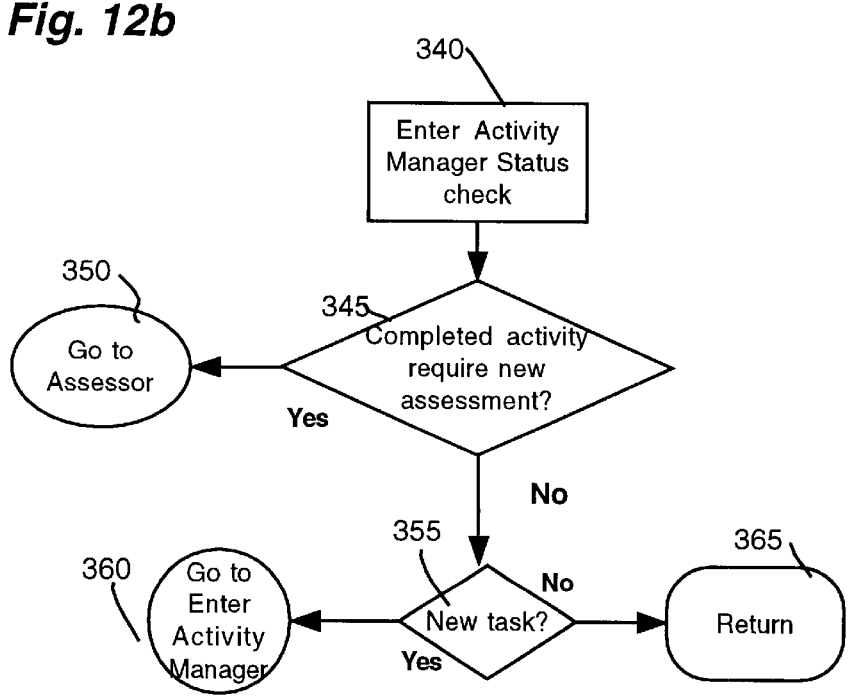

FIG. 12b is a flow diagram of an activity manager's status checking logic.

Figure 13:
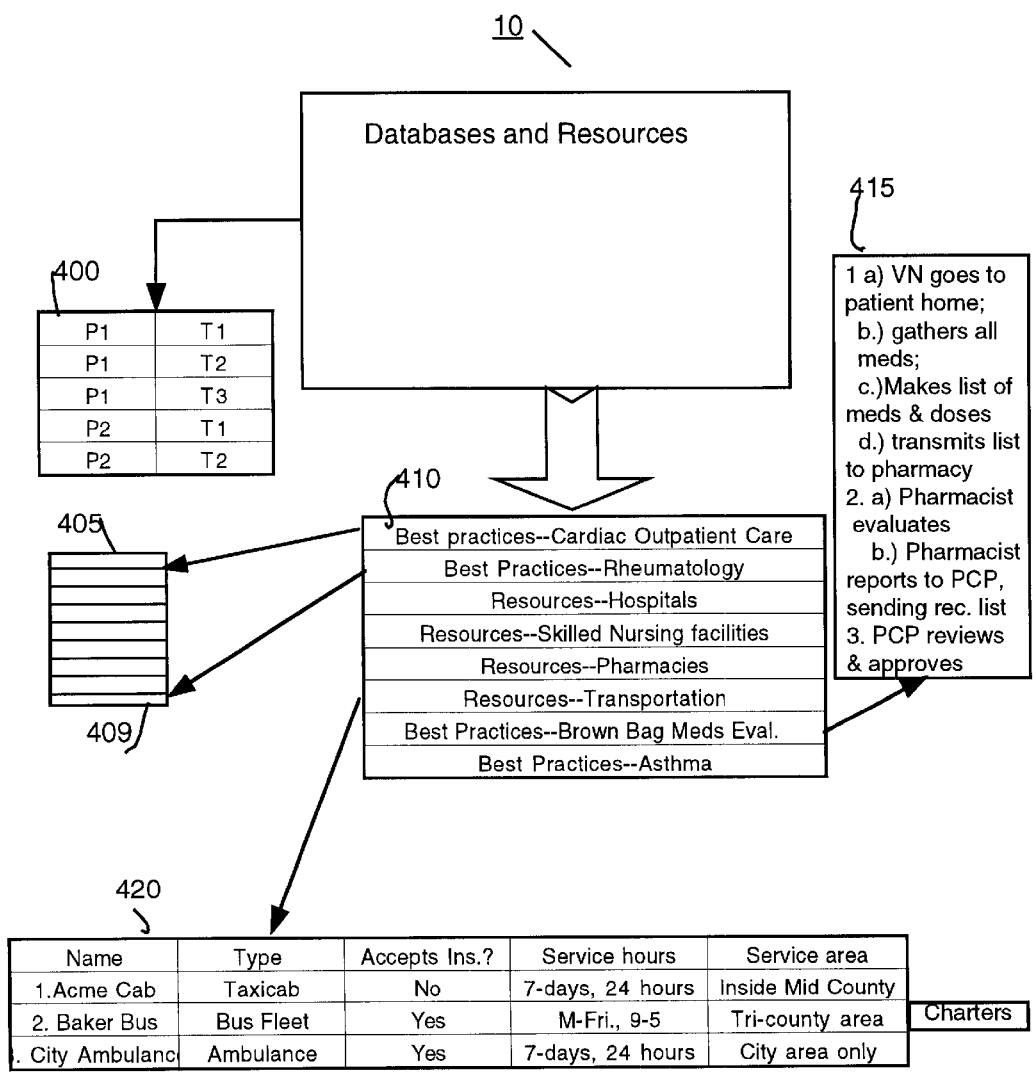

FIG. 13 is a block diagram showing several knowledge databases and resource books of the present invention.

FIG. 14 is a table illustrating typical sentinel data for a health care implementation of the invention.

FIG. 15 is a table illustrating sentinel data for three different types of individuals in a health care implementation of the invention.

Figure 16:
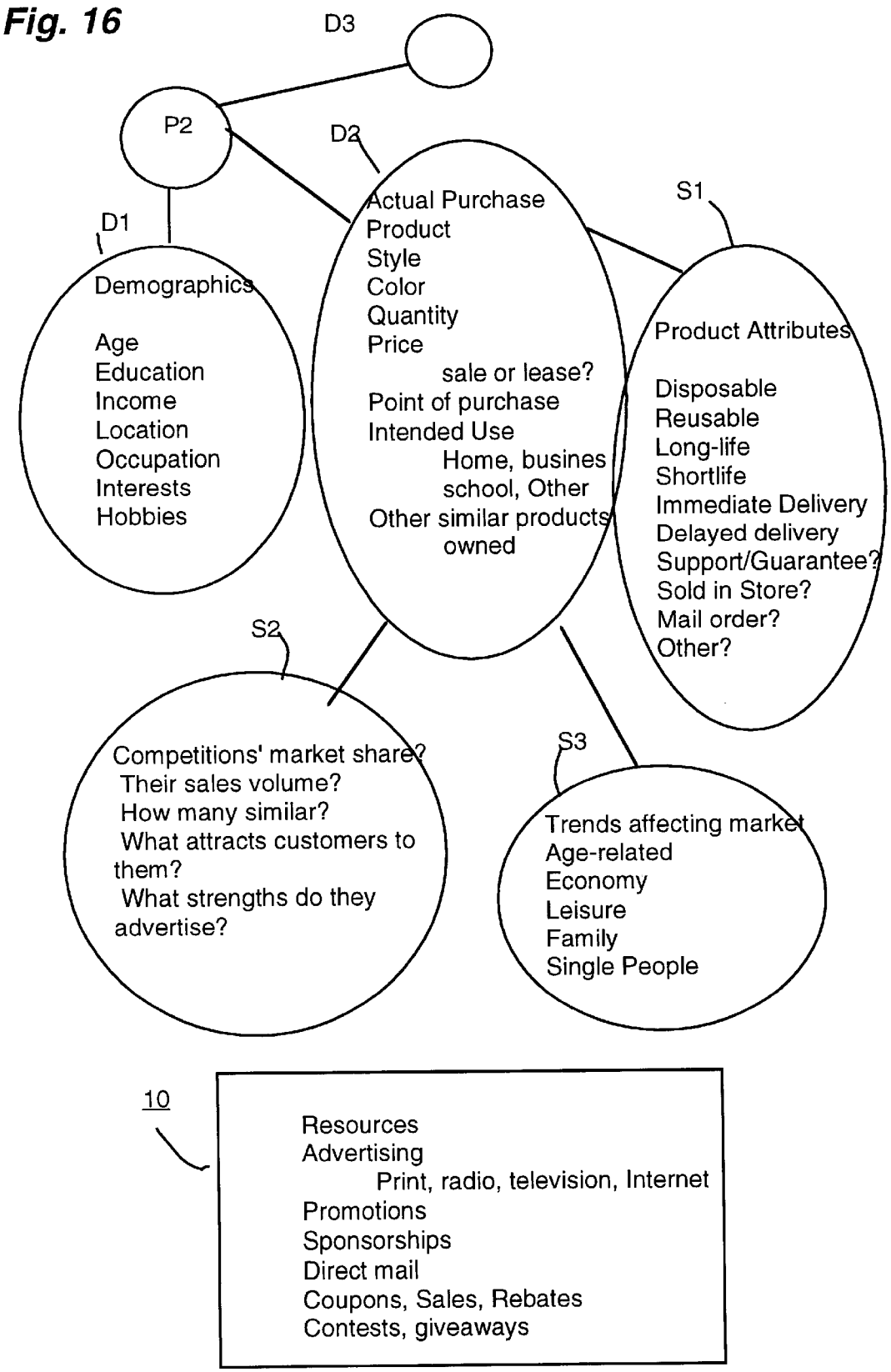

FIG. 16 is a block diagram of potential knowledge bases and resources in a marketing implementation of the invention.

FIG. 17a is a flow diagram of a requirements manager of the present invention.

FIG. 17b is a table containing illustrative minimum requirements for different states of the invention.

FIG. 17c is a sample normalized distribution used in fuzzy logic weighting of the present invention.

DETAILED DESCRIPTION OF THE INVENTION

FIG. 1 shows an overview of the present invention. In a preferred embodiment, assessor 01 is an interactive program which collects data about one or more subjects whose needs will be addressed by the overall system. If the present invention is implemented as a health care system, assessor 01 collects data about a person P1 who is associated with a health care organization, such as an HMO, indemnity payor, or other provider organization. In a preferred embodiment, this information is stored in object-oriented format (which will be described in more detail below). The person P1 is a primary object having several domains D1–D8 in this view. Each domain further describes aspects of the object. In a preferred embodiment, each domain D may have one or more subdomains S (described below). Each domain D is a dimension of information about person P1 which is likely to be relevant to person P1's overall wellbeing. Subdomains S include information about various contexts for a given domain D. Using a health care example, if person P1 is associated with a health care organization, then one domain D of information might be physiological data—pre-existing diseases, current diagnoses, etc. Another domain D might be functional status, such as whether he can walk and take care of himself.

Still in FIG. 1, assessor 01 collects and classifies the information about person P1 for analysis by system manager 05. In a preferred embodiment, system manager 05 is able to make use of multiple knowledge bases kept in storage archive 10. Those skilled in the art will appreciate that storage archive 10 may be contained on one local disk subsystem or distributed over a remote network of nodes through one or more disk subsystems or other media.

In health care implementations, for example, one knowledge base might include electronically stored best practices for clinical management of diagnosed conditions. Another might include experiential recommendations for psychosocial factors. A third might include transportation resources available. A fourth might include resource utilization guidelines.

As FIG. 1 shows, system manager 05 interactively reviews the data collected by assessor program 01 about person P1 with the knowledge bases in storage archive 10 to identify sentinel data 20. In a preferred embodiment, sentinel data 20 is the kind of information likely to suggest actions which win have a significant result in providing not only proper care for person P1 but also in making best use of the resources needed to do so.

Figure 8A:
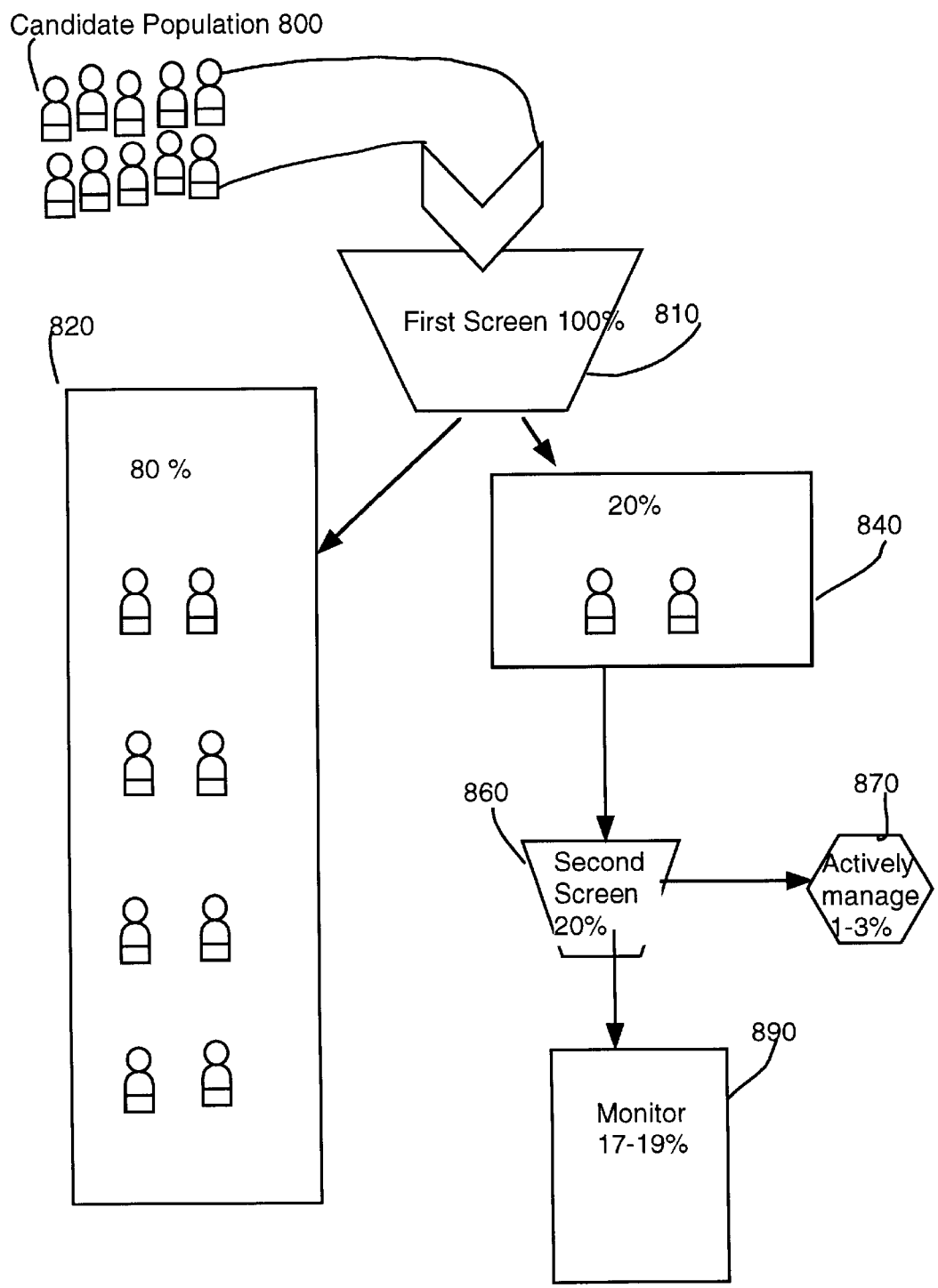
FIG. 8a is an overview flow diagram of the invention's screening process.

Turning briefly to FIG. 8a, in health care a considerable amount of clinical experience is available to enable a health care organization to identify the individuals likely to need high cost care and resources. In a preferred embodiment the entire candidate population 800 of the health care organization is screened by assessor program 01 for health status as shown at step 810. Probability and the Pareto principle suggest that 80% of candidate population 800 will have few or no significant problems requiring care, while 20% will probably have some health problems. The latter 20% are further examined by assessor program 01 in a second screening, shown here at step 860. It is probable that 1–3% of the total population may require active management and care, while 17–19% can be followed more routinely. Frequently, the 1–3% who require active management and care are very likely to benefit from applied knowledge based on clinical experience in other dimensions, such as psychosocial analysis, function analysis, and so on. The present invention enables the health care organization to identify those individuals at high risk, apply the knowledge that is likely to improve their status or at least prevent worsening of it, and do so in a way that also reduces costs.

Now referring to FIG. 8b, the World Health Organization has proposed a treatment model 825 for looking at health problems. In this model, as seen at line 1, there are four main facets of a problem: disease, impairment, disability and handicap. The disease is the underlying physiological process, the impairment is the effect it is having on this particular patient's body, the disability is the effect it has on the patient's view of life, and the handicap is the effect the disease has when seen from society's viewpoint. In the example of FIG. 8b, line 2, if an elderly woman is diagnosed with osteoporosis, that is the disease. A potential impairment it can cause in her body is a hip fracture. The disability from her viewpoint is that she cannot walk. From society's viewpoint, she is likely to need services while recovering, transportation for doctor visits, help with grocery shopping, and so on, if she lives alone.

Each of the elements can add to health care costs, if they occur, and detract from the patient's wellbeing. Ideally, if the disease can be prevented, that is the best outcome. But if not, lowering the risk of hip fractures will lower costs and improve health. If a fracture occurs, assistance can be provided to the patient so that she does not worsen the condition by attempting to walk or go to the store by herself. In a preferred embodiment of the present invention, resources from various fields of expertise are used to identify such risks and implement activities designed to prevent or lower the occurrence and expense of them. Many of these factors are identified by the present invention as sentinel data for health care.

Turning briefly now to FIG. 14, some examples of the types of health care information likely to constitute sentinel data are shown. Under physiology, poor lung condition is likely to require additional oxygen use, an inhaler, and so on. If these can be provided to the patient at the right times and frequencies, serious episodes of lung complications requiring hospitalization expenses may be avoided. However, in addition to this kind of physiological data which some systems may use to create care plans, psychosocial factors and facts about basic functions may play an even more important role in an individual's overall health needs. For example, if the patient is unable to make regular health care appointments for lack of transportation, worsening of symptoms may not be detected in time to make adjustments in medications. Thus, a hospitalization event or trip to the emergency room may occur. Hospitalization may cost several thousands of dollars for one overnight stay. If that patient had been able to obtain cab fare, he might have been given a new prescription in an office visit that kept him out of the hospital. Even if the cost of the office visit and new prescription(s) came to several hundred dollars, they would still be much more cost effective for the health care organization and definitely more comfortable, healthful and less stressful for the patient.

FIG. 15 illustrates how sentinel data 20 which can affect such outcomes, may differ based on physiological, demographic and functional differences of three patients. As shown at line 1 of FIG. 15, the three individuals are a frail elderly person, a middle aged diabetic and a young asthmatic. Note that under physiology, at lines 7, 8, and 9, the diagnostic tests for each are quite different. In a preferred embodiment, the system is able to use the knowledge bases to deduce that for a frail elder, bone densitometry and echo cardiogram measurements are likely to be helpful, while for a middle-aged diabetic, a retinal eye exam is appropriate. Similarly, at line 10 of FIG. 15, psychological sentinel data 20 also differs for each.

When assessor program 01 and system manager 05 analyze each patient, the elderly person is likely to be seen to be at risk for depression and cognitive difficulties, the diabetic at risk for depression and anxiety, while the young asthmatic is more likely to be at risk for anxiety alone. Finally, in FIG. 15, lines 12–18 also show some of the social and resource factors which may be critical for each patient. Clinical experience in a knowledge base may show that the home circumstances of the frail elderly person are likely to be more significant than those of the young asthmatic.

Consequently, in health care systems, sentinel data 20 can be described as those facts or circumstances relevant to the patient's current status which indicate the presence of higher health risks or resource costs that can be mitigated by one or more actions or interventions. Those skilled in the art will appreciate that for other applications, such as school system management for example, other facts and circumstances would constitute sentinel data 20. Similarly, in a preferred embodiment of the present invention, new facts and circumstances which are likely to be sentinel data 20 can be recognized by the system. Activity managers (described in more detail below) can be programmed to review outcomes and resources and propose new procedures. For example, a review of cardiac patients in one service area who take taxicabs to get to the doctor, versus those who are picked up by a regularly scheduled shuttle bus might show the bus provides better health outcomes at a much lower cost. The opposite could be true for a different service area where bus services are not available.

Returning to FIG. 1, once system manager 05 has recognized and compiled sentinel data 20 for person P1, one or more plans 30 are created and stored in storage archive 10. In a preferred embodiment, one or more activity managers 25 are activated to review and implement plans 30. In a preferred embodiment, activity managers can be activated in several ways. Some may be initiated by an individual at a keyboard signalling activation. Others may operate as daemon tasks in the UNIX™ operating system or similar operating systems which allow agents to exist in wait or suspended states until a specified event, such as a time lapse, has occurred. Once an activity manager 25 has been activated, it reviews its plan 30. In a preferred embodiment, an activity manager can review a plan 30 which contains activities and tasks for several different types of task performers. In a preferred embodiment, an activity may consist of several tasks to be done by different task performers.

Still in FIG. 1, if the system implemented here is a health care system, plan 30 might be a list of activities and tasks that need to be done for person P1 by health care task performers 35. Referring now to FIG. 7a, an example of such a health care plan 30 is shown, having tasks that need to be performed by the primary care physician (PCP), at line 2, the nursing staff at line 3, the pharmacist at line 5, and a candystriper or hospital aide at line 4. In a preferred embodiment, activity manager 25 will notify each task performer of the task to be done using the communications medium designated for that task performer. Thus, still in FIG. 7a, assignments for the physician and nursing staff might be sent by email, while those for the candystriper might be sent by fax.

Still in FIG. 7a, in a preferred embodiment, once a task performer has completed a task or subtask, that information is communicated back to activity manager 25, for follow-up. In FIG. 7a, it can be seen by the X's at the end of the respective lines that the physician has completed rounds, the pharmacist has completed the medications and one of the IV drips have been completed by the nursing staff. In this example, note that administration of the medications, on line 6 has not been completed yet. In a preferred embodiment, activity manager 25 can be instructed to check periodically for completions and send out error messages or alerts if action have not been done. FIG. 7a depicts activities likely to occur in a hospital.

In FIG. 7b, activities that can be coordinated from a doctor's office for home care of a patient are shown. Here at line 2 an office aide, possibly the receptionist, is notified by email to call the patient at home each day for glucose test results and key them into the system. The keying activates, at line 3 an activity manager 25 for lab work which can analyze the results to see if they are within an acceptable range. If they are not, the activity manager 25 for lab work generates an alarm and signals actions to be taken.

Similarly, the main activity manager 25 which scheduled these tasks also sent an email to a lab supervisor as indicated at line 4 to notify him or her to review lab analysis reports and signal any alarms or extra actions he or she might suggest. A pharmacist has been notified at line 5 by fax to prepare a new prescription, and as shown at line 8, a courier transportation service should be notified by telephone to pick up the prescription and deliver it to the patient's home. Note in FIG. 7b that additional community members or institutions can also be enlisted using the present invention. For example, at line 6, a church volunteer from the patient's church might be called by telephone to help the patient with banking. Similarly, at line 7, the community meals on wheels program can be notified to delivery meals daily for a week. In a preferred embodiment, an activity that has several tasks, such as a brown bag evaluation (described in more detail below) can also be scheduled and managed by an activity manager 25.

In FIG. 7c, it can be seen that the various task performers in the above example can be located at different places. Task Performer TP1 might be the aide at the doctor's office, using a terminal device 60, connected to a computer 65 which has access to storage archives 10. System manager 05 is seen executing in computer 65 at the doctor's office, as is an activity manager 25. The plan 30 developed there and the tasks are sent by various media, such as over the internet and telephone network 80 to another computer 65b at a laboratory, where task performer TP2 is located. Activity manager 25 in computer 65 at the doctor's office has also sent the instructions to the pharmacist over the internet and telephone network 80 to fax machine 67 at the pharmacist's. Person P1, in FIG. 7c the patient, is also connected by telephone 68 to activity manager 25 and the computer in the doctor's office. In some respects, the present invention enables the doctor's office and the task performers in his or her network to function more like an extended family or small town, in which many people are watching out for the patient.

Returning now to FIG. 1, activity managers 25 keep track of completion of activities 40. Completion information can also be recorded in storage archive 10. Thus, the present invention provides a method for assigning activities and tasks to task performers and accounting for their execution. In a preferred embodiment, reports 15 can also be created to review data about person P1, the actions taken on his or her behalf, the actions taken by one group of task performers, and so on. Also in a preferred embodiment, an activity manager 25 can be created to review efficacy of interventions or to analyze the significance of various types of sentinel data so that the system can be improved. Those skilled in the art will appreciate that neural net technology could also be implemented in one or more of the activity managers 25 to allow such learning or improvement.

Figure 2A:
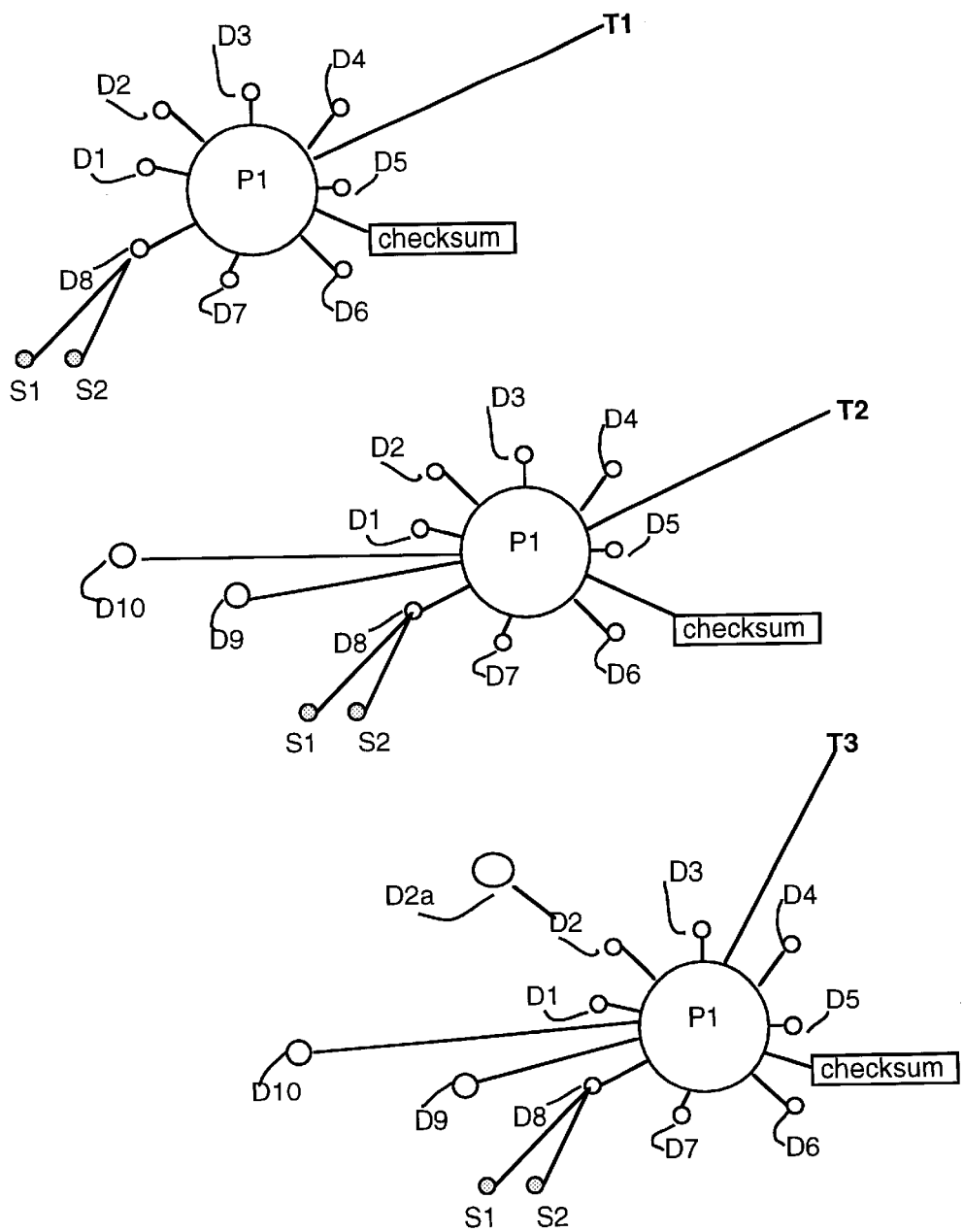
FIG. 2a is schematic diagram of an object created by the invention at three different time periods.

Turning now to FIG. 2a, information about person P1 is shown in three different time periods, T1, T2 and T3. In a preferred embodiment of the invention, each person P1 for whom the system is designed to provide service is described according to a series of domain D descriptors and subdomain S descriptors. Generally speaking, each domain is a major dimension of variable facts and circumstances which may be relevant to an individual's care or wellbeing in the system. For health care, for example, domains D include physiological dimensions, psychological dimensions, sociological dimensions, and so on. In a preferred embodiment, each domain D may also include one or more subdomains which provide further contextual information about person P1 which may be relevant to his or her care or wellbeing.

For example, and still in FIG. 2, domain D8 has two subdomains S1 and S2. If domain D8 covers sociological data, then subdomain S1 may indicate income level and subdomain S2 might indicate native language. In a preferred embodiment of the invention, information such as the domain and subdomain data about a person P1 can be changed easily without destroying the integrity of the earlier data. At time T1, it can be seen that person P1 was described by domains D1–D8 and subdomains S1 and S2. At time T2, two new domains D9 and D10 have been added to person P1's data. In a preferred embodiment, these are time stamped and identified as having a later date than the first set of descriptors. At time T3, domain D2 has been changed as reflected in domain D2a. Note that the original domain D2 is still present, so that the circumstances which existed at that time have not been destroyed.

In a preferred embodiment, T1 of FIG. 2a is one instantiation of the object P1 which includes all of its domains D and subdomains S. T2 represents another instantiation of the object P1, as it existed at time T2. T3 is yet a third instantiation. The present invention also provides for the time integrity of each instantiation by computing a checksum over the data fields of an object, and storing the object and its checksum in encrypted form. As seen in FIG. 2a, the checksum for object P1 at time T1 will differ from that for object P1 at time T2 because the domains and subdomains are different. Even if they were the same, the content of object P1 at time T2 would be different in some way, thus the checksum would be, as well. In addition, each user might select a different algorithm from those known in the art to compute the checksums for that user. This provides a high degree of time integrity, since in order to alter an instantiation, one would have to be a programmer, with access to the keys and passwords on that users's system, who knows the checksum algorithm used and is also able to decrypt or decipher the instantiation from its encrypted form. In a preferred embodiment, encryption techniques known in the art, such as RSA Corporation's methods or Data Encryption Standard (DES) encryption are used. This feature of the invention also allows a full audit trail and full auditing of such records created by the invention.

This preferred embodiment is implemented using IBM Corporation's LOTUS NOTES™ application, which allows a user to instantiate objects in an extensible way, thus allowing domains and subdomains to be added indefinitely and also allows for security protections over a network such as encryption. Those skilled in the art will appreciate that other embodiments could be implemented in C++ or other programming languages, as long as they allow several instantiations of an object so that domains and subdomains can be added indefinitely, and include security provisions such as encryption. Those skilled in the art are aware that LOTUS NOTE™ also simplifies the creation of objects and the description of their inheritance characteristics by permitting the use of templates to define them.

Use of LOTUS NOTES™ also allows a preferred embodiment of the present invention to be distributed over a network in three different ways. First, a centralized hierarchical distribution is possible with one site controlling the replication at other sites. Second, a distributed hierarchy can be used with LOTUS NOTES™ synchronization features to insure that replicated sites are synchronized with each other. Third, dedicated servers can be established to feed various systems as desired. Those skilled in the art will appreciate that other methods could be used to enable distributed computing over a network.

Figure 2B:
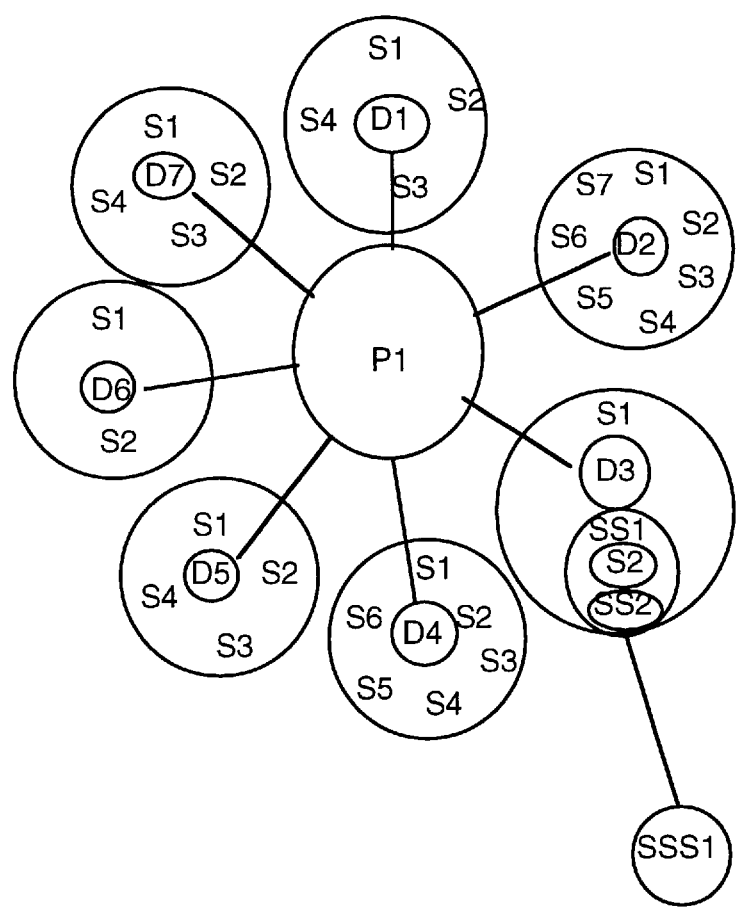
FIG. 2b is a schematic diagram of an object created by the invention having several domains, subdomains, and subsubdomains

Now turning to FIG. 2b, in a preferred embodiment any number of domains, subdomains, subsubdomains, and so on can be established for an object. FIG. 2b illustrates an object P1, which has domains D1–D7, each of which has one or more subdomains S. In domain D3, Subdomain S2 in turn has two subsubdomains, SS1 and SS2. Subsubdomain SS2 also has a subsubsubdomain, SSS1. Each domain and subdomain can also be extended to include more data. This provides the overall system with the ability to provide deeper and deeper layering and detailing of information as necessary. In a preferred embodiment, this layering is limited only by the relevance of the information being modeled.

Referring now to FIG. 9a, a flow diagram of an assessor program 01 of the present invention is shown. Assessor program 01, in a preferred embodiment, keeps information it collects in a cache memory 02, for best performance and results. Also in a preferred embodiment, assessor program 01 interacts with system manager 05 as an assessment takes place. For example, during first screening 90 of person P1, assessor program 01 may learn that the person is over 75. That fact causes it to consult system manager 05 for the relevant questions to pursue for that case in the second screening 94, which will soon take place. Similarly, learning that person P1 is over 75 causes assessor program 01 to initiate a processing thread 92 to locate the best practices for elderly care. If person P1 also indicates that he is a cardiac outpatient, assessor program 01 will also initiate a processing thread 91 to locate best practices for cardiac outpatient care. If person P1 also indicates that he is unable to bathe himself, this will initiate a number of additional processing threads, such as processing thread 93 to find home care resources, and so on. Note that in a preferred embodiment, if person P1 is being given his or her initial screen in a full care facility where he or she is already admitted, system manager 05 will be aware of that fact and assessor program 01 will not initiate any transportation resource processing.

Also, in a preferred embodiment, for system performance an operating system such as UNIX™ or Microsoft's WINDOWS 95™ or WINDOWS NT™ or similar operating systems which support multi-threading is used. For example, Apple Corporation's MAC OS™ or IBM Corporation's OS/MVS™ operating systems could be used as well. Those skilled in the art will appreciate that other operating systems and techniques could be used as well to provide the same overall logic processing. However, if multi-threading is not available in the operating system, performance may be significantly degraded.

Still in FIG. 9a, since this patient has now been identified as a high risk individual, a second screening 94 is initiated. Second screening 94 will prompt for information which assessor program 01 and system manager 05 have deduced will be relevant for this individual. If the individual, for example, is not in a full care facility, but is able to live at home, information about the patient's spouse, family, income, etc. will be collected and appropriate processing threads initiated to recommend resources and interventions. The information that is collected will form domains D and subdomains S about person P1, which are processed at steps 95 and 96, as the sentinel data 20 is identified as well. Finally, assessor program stores the domain and subdomain information about person P1 and goes to system manager 05.

Figure 8C:
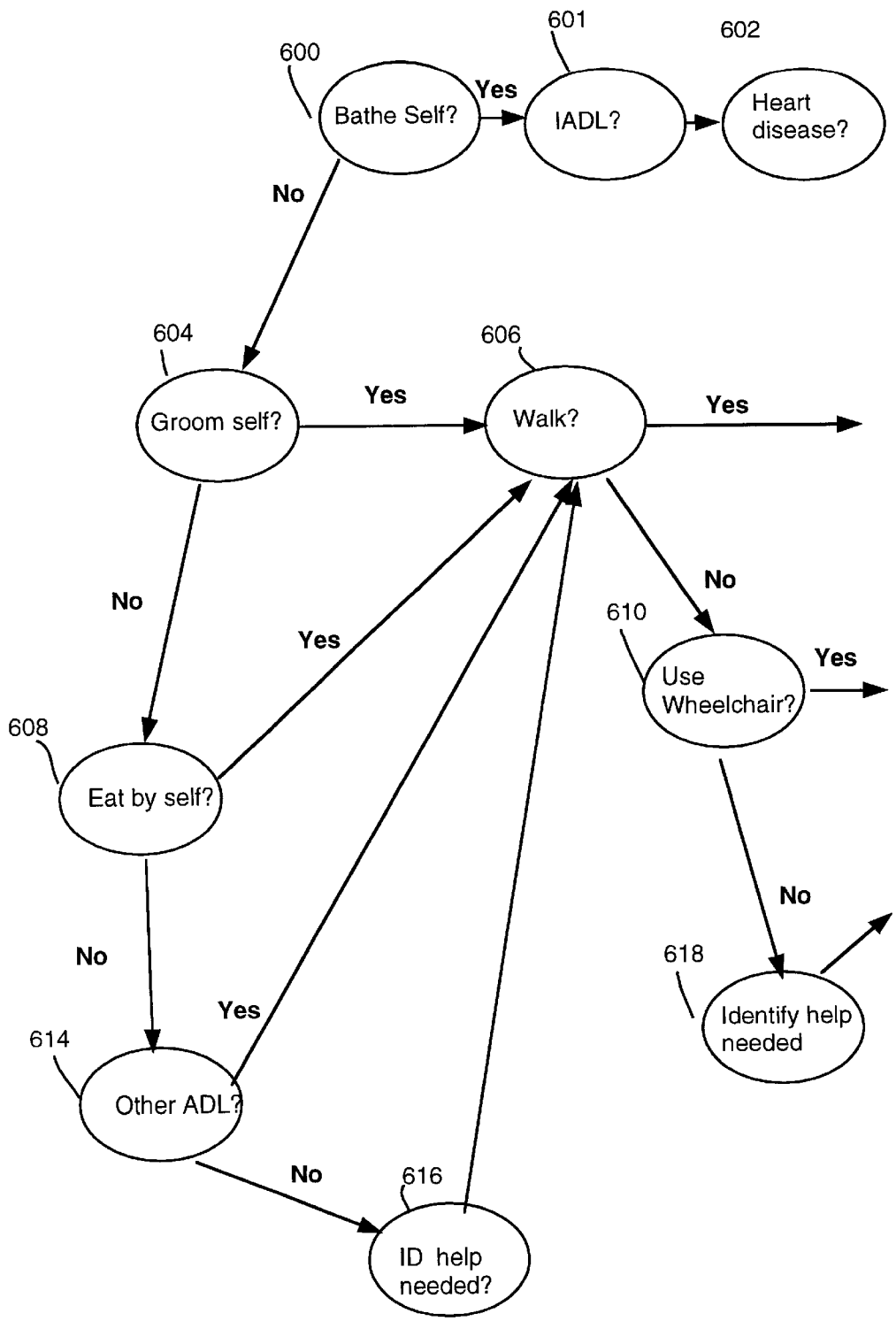
FIG. 8c is an illustrative tree diagram of a second screening of the invention for a health care implementation.

With reference briefly to FIG. 8c, a tree diagram illustrating some of the questions used by assessor 01 is shown. At node 600, for example, assessor 01 asks if the patient can bathe himself. If the answer is yes, assessor 01 simply goes to the next question at node 601, about instrumental activities of daily living (IADL) such as the ability to do his or her own banking. If the answer to bathing is no, assessor 01 asks system manager 05 what additional questions should be asked to assess the needs of this patient. System manager 05 will consult knowledge bases in storage archives 10 and suggest the nodes below node 600, such as can the patient groom himself at node 604, walk at node 606, and so on. As the answers to these questions are given, system manager 05 is able to start collecting sentinel data 20, while assessor 01 fills in the appropriate domain and subdomain descriptors that record the answers. In a preferred embodiment, as responses are completed system manager 05 may determine that additional questions need to be asked. Still in FIG. 8c, if the patient responds that he or she is unable to eat by himself or herself, then a series of questions about other activities of daily living (ADL) may be asked as illustrated here at node 614.

Turning now to FIG. 10, a flow diagram of the logic of system manager 05 is shown. As mentioned above, system manager 05 interacts with assessor program 01, here seen at step 105, to direct the assessment and apply data from the knowledge bases in storage archive 10. When the assessment is complete, system manager 05, at step 110 reads the object's domain and subdomain data and at step 115 continues to apply the knowledge bases. In health care for example, this is where additional best practices may be selected along with suggested action guidelines. At step 120, system manager 05 determines whether the data is sentinel data 20 and if it is, adds suggested actions at step 130 to the plan for this individual. Processing continues in this way until all of the data for the object's domains and subdomains has been processed. A plan is reviewed at step 135 and stored for used by one or more activity managers 25 at step 140. On completion, system manager 05 returns at step 145.

Now turning to FIG. 3, some illustrative domain data classifications from a health care implementation is shown. As seen here, domain D1 is demographic data, which contains subdomains S1 name, S, address, S3 telephone number, and so on. Domain D2 is income, D3 diagnoses, D4, medications, D5 interventions, D6 functional status and D7 caregivers. Those skilled in the art will appreciate that additional or different domains can be used for health care. Similarly, for other implementations in other areas of endeavor, such as school systems or marketing, completely different domains and subdomains are likely to be developed.

In FIG. 4a, more illustrative subdomains S are shown for a health care implementation. In domain D1, demographics, subdomains S5, date of birth, S6, gender and S7 marital status are shown. Note that under Domain D6—functional status—subdomains such as S1 activities of daily living (ADL), S2 transportation, S3 nutrition, and S4 mobility are listed. FIG. 4b shows how additional detail may be included in a subdomain, here S2 address, where the facts about the residence may be recorded which indicate whether it is a single family dwelling, or an apartment, a one story building or multi-story, with or without elevator, and so on.

With reference now to FIG. 5, illustrative plan 30 contents are shown. These are described in terms of sentinel data 20 and suggested activities 21. As described above, system manager 05 identifies sentinel data 20 and applies the knowledge bases to produce suggested activities 21, which together form plan 30 for this person P1. As seen in FIG. 5, the first three lines of plan 30 identify sentinel data 20 associated with pre-operative risks for which a pre-operative consultation is a suggested activity 21. In a preferred embodiment, when the same suggested activity 21 occurs for more than one item of sentinel data, it can be displayed once, instead of three times. Note on line 4, the sentinel data 20 fact that person P1 requires a translator, and the suggested activity 21, which is a referral to a social worker. Also, on line 5, the present invention has also identified the fact that person P1 will need to have his spouse bring him to the hospital. The items on lines 4–6 are factors arising from additional data the present invention collects about person P1, under the direction of assessor program 01 and system manager 05. In conventional fee for service systems this type of data might not be collected systematically at all, or if it is collected, it is done manually by health care workers.

Now turning to FIG. 6, an overview of an activity manager 25 of the present invention is shown. As seen here, activity manager 25 might manage the activities associated with outpatient care handled through a doctor's office. Different levels of skilled caregivers are included in the set of task performers identified to activity manager 25. In FIG. 6, task performers include admin personnel TP2–TP4, a person TP5 from meals on wheels, two drivers TP6 and TP7 from Acme Cab, Dr. Abe TP1, the primary care physician (PCP), Mrs. Doe, the spouse, TP8, and volunteers from the Girl Scouts TP9 and Trinity Church TP10. As in the case of the spouse, not all the task performers are employees of the doctor or health care payor. In a preferred embodiment, an activity manager 25 attempts to assign tasks to task performers with the minimum skill level needed to carry out the task. For example, if a prescription needs to be delivered to the patient's home, it is a waste of skilled resources to use a nurse or physician or pharmacist to perform that task when an admin aide, a church volunteer or a driver from Acme Cab can do it. In FIG. 6, an activity manager 25 is shown managing tasks across one level of care, namely that of an outpatient being followed by a doctor's office. In a preferred embodiment, an activity manager 25 is capable of managing activities and tasks across multiple levels of health care, such as, but not limited to, nursing home, acute hospital, doctor's office, pharmacy and home health care.

This is seen more clearly in FIG. 11. When an activity manager 25 is activated at step 200, it proceeds to step 205 to read the next plan it is given to act upon. At step 210, activity manager 25 identifies the task performers (and their skill levels) available to carry out the plan. Next, at step 215, activity manager 25 assigns tasks to task performers, using the lowest level of skilled task performer needed to carry out the task. Thus, if a task can be carried out by a nurse or an aide, the aide will be selected if one is available. Next, at step 220, activity manager 25 looks up the communications medium to be used for communicating with each task performer. As mentioned above, some task performers can be reached by email, some by fax or telephone, and so on. At step 225, activity manager 25 transmits the assigned tasks to the selected task performers using the designated medium. In some cases, it will be important to have the task performer acknowledge receipt, and that is checked for at step 230. If a task performer has not acknowledged receipt, an error process will be activated at step 240. If everything was received, activity manager 25 at step 235 goes to wait for the completion of tasks.

FIG. 12a diagrams the processing for waiting for task completions. When the wait for completion part of activity manager 25 is entered, activity manager 25 checks at step 305 to see if this activity which caused it to come out of the wait state is completed. If it is, activity manager 25 further checks at step 315 to see if the results are acceptable. If the activity did not complete or had unacceptable results, an error notification is sent at step 320. If completion was acceptable, activity manager 25 checks at step 325 to see if all activities for a given time period are done. If they are, control flows to the activity manager status check. If not, the object's domain and subdomain data are updated, if needed, and the activity manger returns to a wait state.

FIG. 12b show the flow on entry to activity manager 25's status checking. After entry at step 340, activity manager 25 checks at step 345 to see if the completed activity means that a new assessment is required. If it does, control is given to assessor program 01. If not, activity manager 25 checks at step 355 to see if new tasks need to be scheduled. If yes, control goes to the Enter activity manager code. If not, activity manager 25 returns.

Now referring to FIG. 13, a block diagram illustrating some of the database and resource books available to the present invention are shown. As mentioned above, storage archive 10, which may be contained on multiple storage media distributed over several network nodes, contains the knowledge bases and resource books the system uses. As seen in FIG. 13, for a health care system, a patient database 400 holds the instantiations of objects about persons P1, P2, etc. who are the patients looked after by this health care organization. Knowledge bases 410 contain multiple databases which include such items as a best practices cardiac outpatient care database 405, a best practices rheumatology 409, a best practices brown bag evaluation 415, as well as a transportation resources database 420. In a preferred embodiment, a diagnostic expert system could also be included as one of the knowledge bases 410.

Still in FIG. 13, an activity manager 25 might consult storage archive 20 to find best practices brown bag evaluation 415. Activity manager 25 would recognize there are three main activities (the visiting nurse's gathering of medications, a pharmacist's evaluation and the primary care physician's review and approval) and break those down into tasks to be performed. For example, the visiting nurse has four tasks: a) visit the patient's home; b.) gather all the medications used by the patient and temporarily place in a brown bag (hence the name), c.) make a list of all medications and doses and d.) transmit that list to the pharmacist. Control of the transmission might be directed by another database, which indicates how data is to be transmitted and to which eligible pharmacy, where one of the criteria for eligibility is whether the pharmacy accepts this patient's insurance. In a preferred embodiment, activity manager 25 might assign these first four tasks to a visiting nurse and schedule their completion in one week. Activity manager 25 might assign and schedule the selected pharmacist's tasks for the following week, and the primary care physician's review and approval tasks for the third week. Activity manager 25 might send reminders or error notifications if each task is not completed by its scheduled time.

Still in FIG. 13, looking at transportation resources database 420, it can be seen that if an activity manager needs to schedule transportation for a person P1 who lives in Mid county, but not in the City, then City Ambulance is not a transportation resource that can be used. Of the other two, if person P1 is at poverty level, Acme cab company may not be a resource for him, since it does not accept insurance payments. Finally; if person P1 needs transportation outside of the service hours for Baker Bus company, an alert may be needed so that special transportation can be found and arranged.

Referring back to FIG. 1 briefly, requirements manager 25a is also shown. In a preferred embodiment, requirements manager 25a is a special type of activity manager 25 designed to prevent thrashing in the system. As mentioned above, assessor program 01 and system manager 05 interact to determine sentinel data 20 for a given person P1. Assessor program 01 stores the data it collects in a cache memory, as described above as well. And assessor program 01 initiates processing threads as it collects data that suggests the threads may be needed. However, when a system such as this is processing multiple variants in this way, a chicken and egg syndrome may arise, in which a given process state can alter the conditions which caused the state. This, in turn can cause "thrashing" both in the classic sense in which data stored on a hard disk is recursively asked for over and over again and also in the logical sense, in which the program simply keeps repeating the cycle endlessly, locking up the computer.

In a preferred embodiment, the present invention recognizes that some information needs to be cached in order to compute a new state while also recognizing that some information will, of necessity, be undetermined at the moment. Thus, when going into a potential state transition, the present invention is tasked with determining the current state of the environment (what quantities are known with what accuracy) as well as what information is mandatory for state transition processing. The former is modeled using fuzzy logic techniques known in the art, while the latter information is held to a minimum in order to avoid dependency. Thus, as seen in FIG. 17a, when the requirements manager 25a is entered at step 500, it checks to see if the data collected so far meet the minimum requirements for the state about to entered next. If it does, processing proceeds at step 510. If not, at step 515 the missing element(s) are identified, and that information is given to the assessor program 01 at step 520. At that point, assessor program 01 can determine whether such information must be gathered at this point, or whether processing can proceed, but with the need for an additional review.

FIG. 17b illustrates some of the kinds of information that may lead to thrashing in a health care system. As an example, health care is extremely dependent on patient age and gender-these variables figure critically in a vast number of screening evaluations, diagnostic tools and health care related activities. Before lab work can be ordered for example, it is critical to know the patient's gender. A Prostate Screening Antigen (PSA) test would be completely inappropriate in a general checkup for a female. Similarly, routine mammograms are inappropriate for males. In a preferred embodiment, what is considered critical information is based on the already accumulated sentinel data either for an individual patient or for a given population-this is where the fuzzy logic weighting scheme has an effect. Information which is secondary or tertiary for one patient may be identified as critical for another. In children, knowledge of childhood vaccines is critical while it is largely irrelevant for geriatric patients. However, for geriatric patients, the existence of scatter rugs in the home environment has the opposite effect—it constitutes a fall hazard for the elderly and not for the young. Thus, in FIG. 17b, at diagram 525, line 4, for vaccine history for a child req 1 —age is heavily weighted.

In a preferred embodiment, weighting for the fuzzy logic analysis is calculated dynamically. In one preferred embodiment, weighting is computed assuming a normal or "bell-shaped" curved distribution. For example, a geriatric patient might arbitrarily be defined as someone 65 or over. However, many patients of 50 or 55 may have ailments common to geriatrics. So, using a geriatric age normalized around 65, the first sigma deviation would probably capture 85–95% of the geriatric population. In an alternative preferred embodiment, leading edge weighting is used in calculations, so that to the extent the patient is under age 65, he or she is less likely to trigger assessments or other measures directed primarily to geriatrics and to the extent the patient is 65 or over, he or she is much more likely to trigger geriatric assessments, analyses and related actions.

Turning now to FIGS. 9b through 9i, illustrative screen displays of the present invention are shown. FIG. 9b shows a typical screen display for a first screening under the present invention The questions shown here are illustrative of the kinds of questions which can help identify high risk patients for health care.

FIG. 9c shows a screen display that might occur during a more detailed second screening, after one or more major risks have been identified.

FIG. 9d2 is a screen display which illustrates how data about a resource may be entered. In this case, a care facility resource for a skilled nursing resource book is shown. In a preferred embodiment, a resource book contains several such entries for each resource type. If the system user is a health care organization, its resource book for skilled nursing facilities might contain hundreds of entries such as this for hundreds of facilities.

In a preferred embodiment, the present invention also does resource matching. For example, if a patient is ready to be discharged from a hospital but needs a skilled nursing facility, the present invention may collect data about the patient's needs as shown in FIG. 9d2. When these needs have been identified, an activity manager 25 can be initiated to find a best match between the patient's needs as captured on the screen display of FIG. 9d2 and all the skilled nursing facilities available to this patient. In a preferred embodiment, one of the factors, among others, which may be critical for such a match is the insurance the patient has and the insurance accepted by the facility. Consequently, this is yet another fact that is collected and analyzed by the present invention, not only for the patient but for all the resources as well.

Also in a preferred embodiment, resource matching is done in accordance with regulatory requirements. In the United States, both Federal and state governments may also regulate certain services or mandate certain requirements. For example, in Massachusetts, if a woman is discharged from a hospital within 48 hours after giving birth, the woman is entitled to receive a home care visit. Thus, a preferred embodiment of the present invention is able to do resource matching in many different dimensions as well, ranging from the clinical dimension of matching a patient's clinical needs, to financial resource matching and regulatory resource matching.

FIG. 9e is a screen display of a plan 30 for a health care patient. FIG. 9f shows how the activities scheduled by an activity manager 25 of the present invention might be displayed on a calendar. FIGS. 9g, 9h and 9i are screens showing sample reports the present invention can provide. As these latter reports indicate, a considerable amount of information can be analyzed by the system. For example, an activity manager 25 can be initiated to analyze the doctors caring for patients with serious congestive heart failure to see which doctors tend to have the best outcomes. Similarly, if activity completion seems to be decreasing, an activity manager 25 might be initiated to analyze whether additional personnel might be needed or to identify bottlenecks in resource usage. In a preferred embodiment, an activity manager 25 might also be initiated to analyze the results of best practice guidelines to see if improvements can be made in them.

As will be apparent to those skilled in the art, while one preferred embodiment has focused primarily on health care, the present invention could be applied in completely different fields of endeavor. In FIG. 16, for example, some illustrative domains and resources for a marketing implementation are shown. Many large corporations have large amounts of knowledge about their customers' buying preferences and habits derived from warranty return cards, supermarket shopping cards, shelf scanners and so on. Data vending companies sell data about value and lifestyle analysis of populations by zip code. As suggested in FIG. 16, the present invention could be used to refine the use of this information along with the development of marketing and promotional plans that maximize resource usage.

In a preferred embodiment, the present invention is implemented in LOTUS NOTES™ on UNIX™, WINDOWS 95 and WINDOWS NT systems, but as will be apparent to those skilled in the art, it could also be implemented in any of a number of programming languages such as JAVA, C, C++, assembler, ADA, Pascal, and any number of operating systems. While a preferred embodiment uses the object-oriented file structure of LOTUS NOTES™, any of a number of relational databases or database management programs commercially available could also be used, as could flat files. Similarly, while a preferred embodiment uses software programs to implement the invention, those skilled in the art know that some or all of the present invention could also be implemented in firmware or circuitry without deviating from the spirit of the present invention. Those skilled in the art will appreciate that the embodiments described above are illustrative only and that other systems in the spirit of the teachings herein fall within the scope of the invention.

What is claimed is:

1. A computer system for managing applied knowledge from a plurality of databases to effect actions in behalf of a subject, comprising:
   an assessor program for collecting, assessing and storing data about the subject in an instantiation of an object;
   a system manager program for applying knowledge from at least one database to the object to identify sentinel data and suggested activities and prepare at least one plan therefrom related to the object;
   an activity manager program for reading the plan to create at least one activity list containing tasks for task performers known to the computer system, for assigning tasks to the task performers, and for communicating the assigned tasks to the task performers, so that each task performer can carry out the assigned tasks in behalf of the subject.

2. The apparatus of claim 1, wherein the data about the subject includes at least one dimension of descriptive information about aspects of the subject which is stored as a domain of the object.

3. The apparatus of claim 2, wherein each domain of an object is capable of including at least one subdomain containing contextually descriptive information about the domain of which it forms a part.

4. The apparatus of claim 2, wherein the data about the subject includes at least one dimension of descriptive information about health care relevant aspects of the subject which is stored as a domain of the object.

5. The apparatus of claim 4, wherein each domain of an object includes at least one subdomain containing contextually descriptive information about the domain of which it forms a part.

6. The apparatus of claim 1, wherein a change made to an object causes a changed instantiation of the object to be stored together with the first instantiation of the object.

7. The apparatus of claim 1, wherein the object is instantiated in an extensible manner, allowing multiple levels of additional detail to be added indefinitely.

8. The apparatus of claim 1, wherein a checksum is computed for each instantiation of an object so that the instantiation and the checksum can be stored in encrypted form to provide time integrity to an instantiation.

9. The apparatus of claim 8, wherein the encrypted instantiations provide an audit trail for auditing purposes.

10. The apparatus of claim 1, wherein the assessor program conducts a first screening of candidate subjects by posing assessment questions to identify subjects most likely to require more detailed assessments in a second screening.

11. The apparatus of claim 10 wherein the assessor program interacts with the system manager program during a first screening to determine which additional assessment questions to ask about the subject during a second screening.

12. The apparatus of claim 1 wherein the assessor program is re-entered to perform additional assessments of a subject.

13. The apparatus of claim 1, wherein the system manager program dynamically identifies sentinel data during the assessor program's assessment.

14. The apparatus of claim 13, wherein the system manager applies data from a plurality of different and distributed knowledge bases over a telecommunications network.

15. The apparatus of claim 14, wherein the knowledge bases contain information about health care.

16. The apparatus of claim 14, wherein the knowledge bases include resource books containing information about resources which may be of use for the subject.

17. The apparatus of claim 16, wherein an activity manager is initiated to perform resource matching by finding a best match between stated needs of a subject and resources contained in the resource book.

18. The apparatus of claim 16 wherein the resource books contain information relevant to a plurality of health care resources.

19. The apparatus of claim 14, wherein the knowledge bases include best practice databases describing the best practices known for performing defined tasks.

20. The apparatus of claim 1, wherein the activity manager selects task performers with the appropriate skill level for the tasks on the activity list, so that optimal use of task performers is achieved.

21. The apparatus of claim 1, wherein the activity manager communicates the assigned tasks to the task performers using the communications medium designated for that task performer.

22. The apparatus of claim 1, wherein the activity manager assigns tasks to task performers in a plurality of facilities and locations.

23. The apparatus of claim 1, wherein a second activity manager is initiated as a requirements manager to prevent thrashing in the system as the assessor program and the system manager program enter a potential state transition.

24. The apparatus of claim 23, wherein the requirements manager prevents thrashing by using fuzzy logic to determine which quantities are known with what certainty and what information is mandatory for the state transition.

25. The apparatus of claim 1, wherein the activity manager verifies the completion of assigned tasks and activities.

26. The apparafus of claim 25, wherein the activity manager, upon completion of assigned tasks and activities activates the assessor program to initiate a re-assessment of the subject.

27. The apparatus of claim 1, wherein the subject is associated with a health care organization.

28. The apparatus of claim 1, wherein an activity manager nitiates at least one second activity manager to manage a subset of activities.

29. The apparatus of claim 1, wherein the subject is associated with an eldercare organization.

30. The apparatus of claim 29 wherein the knowledge bases contain information about eldercare.

31. The apparatus of claim 29, wherein the resources books contain information relevant to a plurality of eldercare resources.

32. The apparatus of claim 1, wherein the activity manager program is capable of creating reports aggregating and analyzing the performance and efficiency of task performers.

33. A method for managing applied knowledge from a plurality of databases in a computer system to effect actions in behalf of a subject, comprising the steps of:
collecting, assessing and storing data about the subject in an instantiation of an object created using object-oriented techniques;
applying knowledge from at least one database to the object to identify sentinel data and suggested activities and prepare at least one plan therefrom related to the object;
managing workflow by reading the plan to create at least one activity list containing tasks for task performers known to the computer system, assigning tasks to the task performers, and communicating the assigned tasks to the task performers, so that each task performer can carry out the assigned tasks in behalf of the object.

34. The method of claim 33, wherein the step of collecting further comprises the step of collecting data about a subject associated with an eldercare organization.

35. The method of claim 33, wherein the step of collecting data about the subject includes the step of collecting at least one dimension of descriptive information about aspects of the subject and storing it as a domain of the object.

36. The method of claim 35, wherein the step of collecting further comprises the step of including at least one subdomain containing contextually descriptive information about the domain of which it forms a part.

37. The method of claim 35, wherein step of collecting data about the subject further comprises the step of collecting at least one dimension of descriptive information about eldercare relevant aspects of the subject and storing it as a domain of the object.

38. The method of claim 33, wherein the step of collecting further comprises the step of causing a change made to an object to be stored as a second instantiation of the object, together with the first instantiation of the object.

39. The method of claim 33, wherein the step of collecting further comprises the step of instantiating the object in an extensible manner, allowing multiple levels of additional detail to be added indefinitely.

40. The method of claim 33, wherein the step of collecting further comprises the step of computing a checksum for each instantiation of an object so that the instantiation and the checksum can be stored in encrypted form to provide time integrity to an instantiation.

41. The method of claim 40, wherein the step of encrypting further comprises the step of providing an audit trail for auditing purposes.

42. The method of claim 33, wherein the step of collecting further comprise the step of conducting a first screening of candidate subjects to identify subjects most likely to require more detailed assessments in a second screening.

43. The method of claim 33, wherein the step of collecting interacts with the step of applying knowledge during a first screening to determine which additional assessment questions to ask about the subject during a second screening.

44. The method of claim 33 wherein the step of collecting can be re-entered to perform additional assessments of a subject.

45. The method of claim 33, wherein the step of applying knowledge further comprises the step of dynamically identifying sentinel data during the step of collecting.

46. The method of claim 45, wherein the step of applying knowledge further comprises the step of applying knowledge from a plurality of different and distributed knowledge bases over a telecommunications network.

47. The method of claim 33, wherein the step of applying knowledge further comprises the step of applying knowledge from resource books containing information about resources which may be of use for the subject.

48. The method of claim 33, wherein the step of applying knowledge further comprises the step of applying knowledge from best practice databases describing the best practices known for performing defined tasks.

49. The method of claim 33, wherein the step of managing workflow further comprises the step of selecting task performers with the appropriate skill level for the tasks on the activity list, so that optimal use of task performers is achieved.

50. The method of claim 49, wherein the step of managing workflow further comprises the step of resource matching by finding a best match between stated needs of a subject and resources contained in the resource book.

51. The method of claim 33, wherein the step of managing workflow further comprises the step of communicating the assigned tasks to the task performers using the communications medium designated for that task performer.

52. The method of claim 33, wherein the step of managing workflow further comprises the step of assigning tasks to task performers in a plurality of facilities and locations.

53. The method of claim 33, wherein the step of managing workflow further comprises the step of managing requirements to prevent thrashing in the system as the step of collecting and the step of applying knowledge enter a potential state transition.

54. The method of claim 53, wherein the step of managing requirements prevents thrashing by using fuzzy logic to determine which quantities are known with what certainty and what information is mandatory for the state transition.

55. The method of claim 33, wherein the step of managing workflow further comprises the step of verifying the completion of assigned tasks and activities.

56. The method of claim 55, wherein the step of verifying the completion further comprises the step of activating the collecting step to initiate a re-assessment of the subject if required.

57. The method of claim 33, wherein the step of managing workflow further comprises the step of a second step of managing workflow to manage a subset of activities.

58. The method of claim 35, wherein step of collecting data about the subject further comprises the step of collecting at least one dimension of descriptive information about health care relevant aspects of the subject and storing it as a domain of the object.

59. The method of claim 58, wherein the step of collecting further comprises the step of including at least one subdomain containing contextually descriptive information about the domain of which it forms a part.

60. The method of claim 33, wherein the step of collecting further comprises the step of collecting data about a subject associated with a health care organization.

61. The method of claim 60, wherein step of applying knowledge further comprises the step of applying knowledge about health care.

62. The method of claim 60, wherein the step of applying knowledge further comprises the step of applying knowledge from resource books containing information relevant to a plurality of health care resources.

63. The apparatus of claim 2 wherein the data about the subject includes at least one dimension of descriptive information about eldercare relevant aspects of the subject which is stored as a domain of the object.

64. The apparatus of claim 1, wherein the activity manager program is capable of creating reports on the status of tasks performed for an individual subject.

65. The method of claim 34, wherein step of applying knowledge further comprises the step of applying knowledge about eldercare.

66. The method of claim 34, wherein the step of applying knowledge further comprises the step of applying knowledge from resource books containing information relevant to a plurality of eldercare resources.

67. The method of claim 33, wherein the step of managing workflow further comprises the step of creating reports on the status of tasks performed for an individual subject.

68. The method of claim 33, wherein the step of managing workflow further comprises the step of creating reports aggregating and analyzing the performance and efficiency of task performers.

* * * * *